US010255826B2

(12) United States Patent
Haramein

(10) Patent No.: US 10,255,826 B2
(45) Date of Patent: *Apr. 9, 2019

(54) MODULAR FRAMES FOR ARRANGEMENT AND ORIENTATION OF GEOMETRIC SOLIDS

(71) Applicant: ARK CRYSTAL, LLC, San Clemente, CA (US)

(72) Inventor: Nassim Haramein, Carlsbad, CA (US)

(73) Assignee: ARK CRYSTAL, LLC, San Clemente, CA (US)

(*) Notice: Subject to any disclaimer, the term of this patent is extended or adjusted under 35 U.S.C. 154(b) by 225 days.

This patent is subject to a terminal disclaimer.

(21) Appl. No.: 15/258,361

(22) Filed: Sep. 7, 2016

(65) Prior Publication Data
US 2016/0379524 A1    Dec. 29, 2016

Related U.S. Application Data

(63) Continuation of application No. 14/080,585, filed on Nov. 14, 2013, now Pat. No. 9,466,228, which is a continuation-in-part of application No. 13/677,216, filed on Nov. 14, 2012, now abandoned.

(60) Provisional application No. 61/559,576, filed on Nov. 14, 2011.

(51) Int. Cl.
*G09B 23/26* (2006.01)
*A45C 11/16* (2006.01)
*G09B 23/18* (2006.01)

(52) U.S. Cl.
CPC ............. *G09B 23/26* (2013.01); *A45C 11/16* (2013.01); *G09B 23/181* (2013.01)

(58) Field of Classification Search
USPC ......... 434/278, 365, 367, 369; 446/111, 112, 446/114, 115, 116, 120, 122, 124, 125
See application file for complete search history.

(56) References Cited

U.S. PATENT DOCUMENTS

| | | | |
|---|---|---|---|
| 1,434,886 | A | 11/1922 | Greenfield |
| 2,032,955 | A | 3/1936 | Roussy |
| 2,057,942 | A | 10/1936 | Aurele |
| 2,716,292 | A | 8/1955 | Benjamin |
| 3,148,539 | A | 9/1964 | Cook |
| 4,055,019 | A | 10/1977 | Harvey |
| 4,129,975 | A | 12/1978 | Gabriel |
| 4,214,404 | A | 7/1980 | Fischer |
| 4,701,131 | A | 10/1987 | Hildebrandt |
| 4,763,489 | A | 8/1988 | Strong |
| 4,792,319 | A | 12/1988 | Svagerko |
| 5,183,430 | A | 2/1993 | Swann |

(Continued)

FOREIGN PATENT DOCUMENTS

| | | |
|---|---|---|
| FR | 2618311 | 7/1987 |
| GB | 2466724 | 7/2010 |

(Continued)

*Primary Examiner* — Kurt Fernstrom
(74) *Attorney, Agent, or Firm* — Fish IP Law, LLP

(57) ABSTRACT

Modular frames for instructional use that provide secure mounts for geometric solids are presented. Some contemplated modular frames can be assembled into three dimensional modular devices and are particularly suitable for instructional purposes. Modular devices comprising two or more frames could be coupled via a clip in two or more different configurations. Containers including conductive material and configured to provide a Faraday cage around their contents are also provided.

8 Claims, 28 Drawing Sheets

(56) References Cited

U.S. PATENT DOCUMENTS

| | | | |
|---|---|---|---|
| 5,430,989 | A | 7/1995 | Jones |
| 5,472,365 | A | 12/1995 | Engel |
| 5,575,701 | A | 11/1996 | Hantman |
| 5,707,268 | A | 1/1998 | Outman |
| 5,897,417 | A | 4/1999 | Grey |
| D409,668 | S | 5/1999 | Madner |
| 6,059,631 | A | 5/2000 | Maddock |
| 6,164,815 | A | 12/2000 | Degonda |
| 6,179,757 | B1 | 1/2001 | Lin |
| 6,325,694 | B1 | 12/2001 | Clever |
| 6,382,982 | B1 | 5/2002 | Wilcox et al. |
| 6,450,853 | B1 | 9/2002 | Larws |
| 6,558,065 | B2 | 5/2003 | Huang |
| 7,156,392 | B2 | 1/2007 | Plein |
| 7,316,598 | B1 | 1/2008 | Lock |
| 7,780,499 | B1 | 8/2010 | Truckai |
| 9,199,182 | B2 | 12/2015 | Hunts |
| 2005/0026535 | A1 | 2/2005 | Balanchi |
| 2010/0083702 | A1 | 4/2010 | Joseph |
| 2011/0107706 | A1 | 5/2011 | Fleishman |

FOREIGN PATENT DOCUMENTS

| | | |
|---|---|---|
| GB | 2463977 | 1/2011 |
| WO | 02/055168 A1 | 7/2002 |
| WO | 2007/091885 | 8/2007 |
| WO | 2008/061359 A1 | 5/2008 |
| WO | 2010/138995 | 12/2010 |

201B
201A

201C 201D
201E

MODULAR FRAMES FOR ARRANGEMENT AND ORIENTATION OF GEOMETRIC SOLIDS

This application is a continuation of U.S. patent application Ser. No. 14/080,585, filed on Nov. 14, 2013, which is a continuation-in-part of U.S. patent application Ser. No. 13/677,216, filed on Nov. 14, 2012, which claims the benefit of priority to U.S. Provisional Application No. 61/559,576, filed on Nov. 14, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is educational devices and tools, more specifically educational devices and tools for securing and orienting geometric solids, crystalline solids, or other regular structures.

BACKGROUND

Numerous objects made by nature and by man can demonstrate interesting collective effects that are not observed in those objects when in isolation. For example, a set of lenses, refractive crystals, or magnets can be arranged in such a way as to produce phenomena not observed for any one member of the set, and different arrangements of such elements can reveal different collective effects. While numerous stands or mounts for individual elements are available, tools for the study or instruction of such collective effects are lacking.

Attempts have been made to provide devices that provide instructional tools for the collective behavior of multiple elements. For example, U.S. Pat. No. 6,382,982 discloses a device that permits arrangement of various optical elements in different ways in order to study their combined effects. The disclosed devices, however, arrange such optical elements along a linear track, and do not provide for the study of more complex, three dimensional arrangements. U.S. Pat. No. 2,716,292 discloses another instructional device that utilizes a series of planar plastic sheets to support spherical elements that represent atoms. The device is adaptable to display a variety of three dimensional crystal lattice structures. The disclosed elements, however, are not interactive, and if they were the closed arrangement of supportive material between the elements could potentially interfere with their interactions.

Devices that can provide relatively complex three dimensional structures, such as those disclosed in International Patent Application No. WO 02/055168A1 and International Patent Application No WO2008061359A1, are also known. The devices disclosed in these applications provide modular components that can be assembled into three dimensional structural shapes that include open regions. Similarly, U.S. Pat. No. 7,780,499 discloses a set of modular components that utilize complementary and reversible connectors to form complex three dimensional shapes. The suitability of such structures for securing and protecting objects, however, is not clear.

While the above cited art discusses various aspects of securing interactive instructional elements and in providing support for complex three dimensional structures, they each fail to provide a desired level of support, safety, and interactivity to support their use as instructional tools for learning about the collective actions of interactive elements oriented in three dimensions. Thus, there is still a need for improved modular frames for supporting, orienting, and safely protecting such elements.

SUMMARY OF THE INVENTION

The inventive subject matter provides apparatus, systems and methods in which a modular frame provides for at least one of securing and orienting one or more geometric solids (for example, a crystal or a crystalline solid), preferably possessing at least one vertex and one edge. Such an apparatus, system, or method can serve as an educational tool utilized in the demonstration or investigation of effects realized by the placement or orientation of such a geometric solid relative to its environment. Similarly, embodiments of the inventive concept can serve as educational tools utilized in the investigation of effects realized by the placement or orientation of a plurality of geometric solids relative to their environment or to each other. The frame can include at least one vertex saddle configured to receive a vertex of a geometric solid. The frame can further comprise at least one edge strut that can couple with the saddle in a reversible manner via a first fastener. Such an edge strut can be configured to cover or conform to at least a portion of an edge of a geometric structure. In some embodiments, the frame can include multiple saddles and struts configured to hold a tetrahedral solid or other geometric solid of any suitable shape (e.g., trihedral, icosahedron, cube, rectangular cube, sphere, ovoid, etc.). Further, a frame of the inventive concept can be modular; such a frame can be configured to mate with at least one of a support, a frame, a frame component, or a portion, multiples or combinations thereof.

It is contemplated that a single set of vertex saddles (e.g., 2 saddles, 5 saddles, 10 saddles, etc.) and edge struts (e.g., 1 strut, 3 struts, 5 struts, 10 struts, etc.) can be used to hold different geometric solids having different dimensions and shapes. For example, four vertex saddles and six edge struts can be coupled to one another to hold a single tetrahedron crystal. Such a frame can then be readily modified by a user to hold a cubical crystal. For example, the four vertex saddles and six edge struts can be uncoupled, then four additional vertex saddles and six additional edge struts coupled around the cubical crystal.

In another aspect of the inventive subject matter, a modular frame for scientific instructional use comprises upper and lower sub-frame components (top and bottom portions, respectively) configured to removably fasten to one another to at least partially enclose a crystal or other geometric structure. Where the geometric structure comprises a crystal having a truncated and chamfered tetrahedron shape (as shown in FIG. 1A), the modular frame could advantageously include four vertex saddles and six edge protecting frame arms, such that the crystal is protected at least along its vertices and edges, while faces can be partially exposed.

It should be appreciated that the vertex saddles and frame arms could be provided by one or both of the sub-frame components. It should also be appreciated that a vertex saddle or frame arms could be formed by the coupling of two or more sub-frame components.

Each sub-frame component could removably attach to another sub-frame component via any commercially suitable coupler or fastener (e.g., snaps, clips, clasps, etc.). For example, one sub-frame could comprise a plurality of hooked protrusions around a perimeter, while a different sub-frame comprises a plurality of catches sized and dimensioned to mate with the hooked protrusions. In such an embodiment, the hooked protrusions could comprise a material and thickness having a sufficient flexibility such that each of the hooked protrusions could slide into the plurality of catches. The material could also be sufficiently rigid such that the sub-frames remain coupled with one another until a user forcibly slides a protrusion away from its respective catch.

In another aspect of the inventive subject matter, a modular device comprises two or more modular frames coupled with one another via one or more clips. Each modular frame could comprise at least one clip accepting portion sized and dimensioned to receive a clip. The clip accepting portion(s) could comprise a plurality of recesses, protrusions, or a combination thereof, and the clip could comprise complementary recesses, protrusions, or a combination thereof. For example, where a clip accepting portion comprises four recesses on a first side and four recesses on a second side, the clip coupled comprise four complementary protrusions on a first side and four complementary protrusions on a second side.

It should be appreciated that each frame and each sub-frame component (or portion of a frame) could comprise any suitable number of vertex saddles (e.g., 1, 2, 3, 4, 5, 6, 7, 8, 9, 10 or even more), frame arms (e.g., 1, 2, 3, 4, 5, 6, 7, 8, 9, 10 or even more), clip receiving portions (e.g., 1, 2, 3, 4, 5, 6, 7, 8, 9, 10 or even more), or couplers or fasteners (e.g., 1, 2, 3, 4, 5, 6, 7, 8, 9, 10 or even more). It should also be appreciated that a modular device of the inventive subject matter couple comprises any suitable number of frames coupled to one another.

A modular device of the inventive subject matter could comprise two or more frames coupled together via one or more clips or other couplers. Preferably each frame comprises a clip receiving portion (e.g., a recessed portion of a frame) and a corresponding clip that is sized and dimensioned to fit snugly in the clip receiving portion such that the clip appears to be, and could even be, a cutout from the frame itself. The clip could advantageously be used to cover a clip receiving portion to create a smooth outer surface (e.g., not exposing a recessed portion). Additionally or alternatively, the clip could be used to removably attach two frames by having a first end coupling with a portion of a first frame's clip receiving portion, and a second end coupling with a portion of a second frame's clip receiving portion.

One should appreciate that a modular frame of the inventive subject matter could comprise any suitable size and shape for holding any suitable geometric solid. While the disclosure herein is primarily directed towards geometric solids having a truncated and chamfered tetrahedron shape, a modular frame could be sized and dimensioned to hold a spherical solid, cube shaped solid, rectangular cube shaped solid, prism shaped solid, cylindrical solid, or any other suitable solid.

In yet another aspect of the inventive subject matter, a storage container or box comprises a lid portion and a bottom portion, each one covered in at least one conductive material (e.g., copper, silver, gold, conductive polymer, wire mesh, etc.). The lid portion can pivot, slide, or otherwise move relative to the bottom portion, and in some positions (e.g. when forming an enclosed or nearly enclosed cavity) can electrically couple to the bottom portion to form a conductive frame around an item (or a portion thereof) enclosed within the storage box (e.g., at least partially within a cavity surrounded by the lid portion and the bottom portion). In some embodiments of the inventive concept the storage box can form a faraday cage around at least a portion of the storage box interior when the lid portion is substantially or completely closed.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 10A shows a perspective view of a spring clip. FIG. 10B shows a perspective view of a tension clip.

FIG. 14A shows an example of a container with an external frame interface. FIG. 14B shows an example of a container with an external frame interface and an attached frame.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed techniques provide modular frames useful for securing and orienting geometric solids (e.g., a crystal, gem, stone, etc.), where the frames can couple with at least one of a base and one or more frames to form complex geometries that are useful for the demonstration and investigation of the interactions of such geometric solids with elements of their environment, either alone or in combination with other geometric solids. As such, embodiments of the inventive concept are particularly suitable for educational purposes.

Figure 1A:
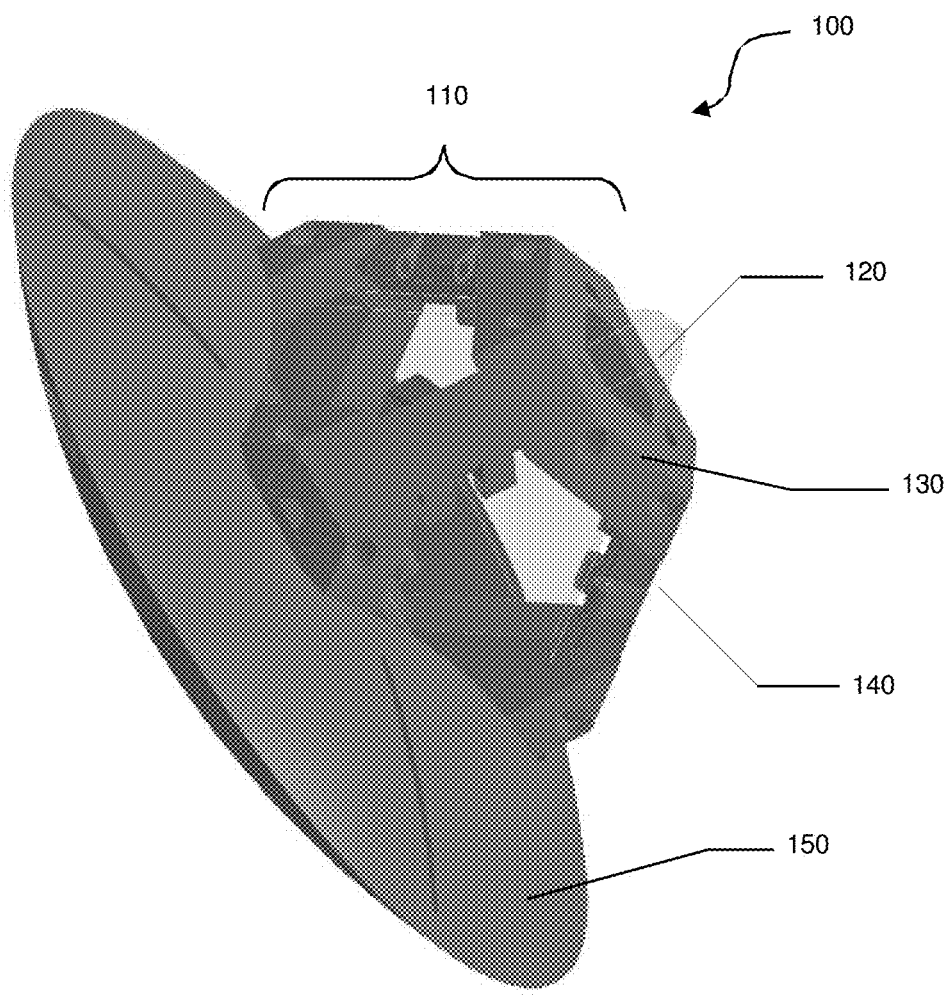
FIG. 1A is a perspective view of one embodiment of a modular frame of the inventive subject matter.
Figure 1B:
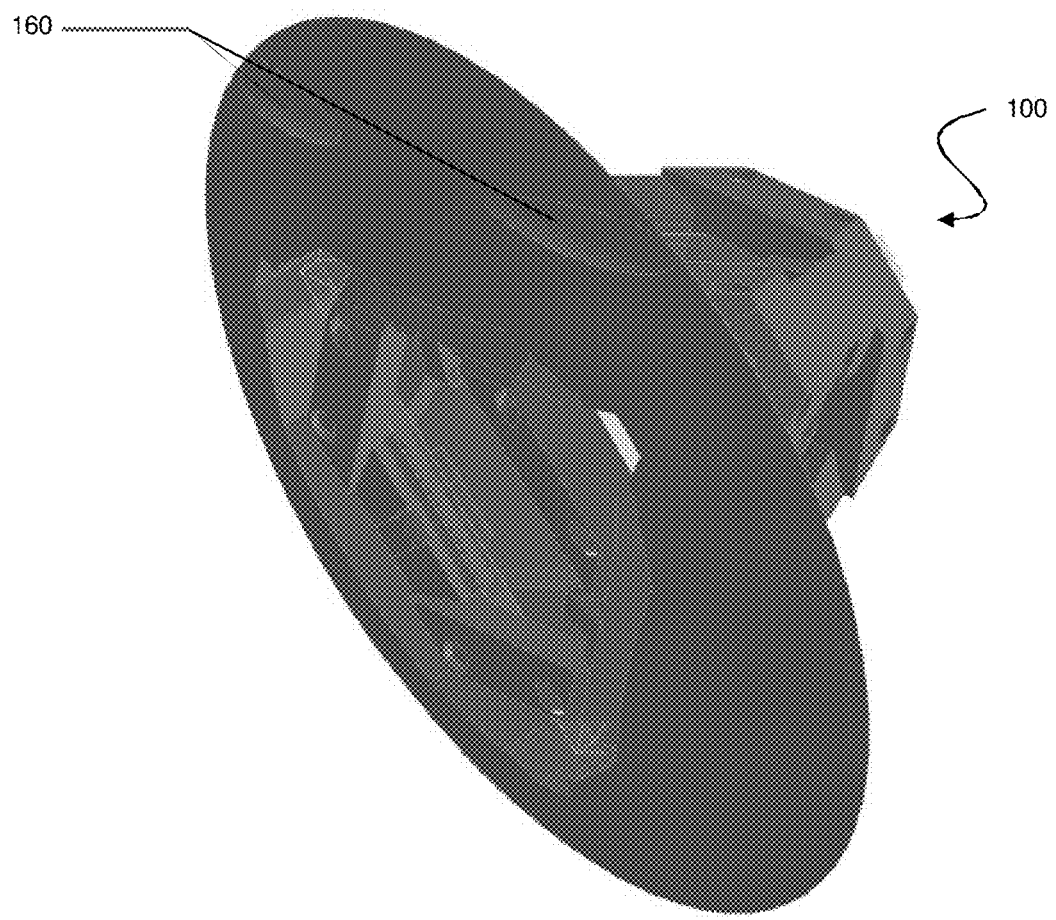
FIG. 1B is another perspective view of the modular frame of FIG. 1A.

FIGS. 1A and 1B are perspective views of one embodiment of the inventive subject matter arranged to secure a single geometric solid or crystal. The support 100 comprises a modular frame 110, and a base 150. The modular frame 110 comprises four vertex saddles 130 and six edge struts 140, and is configured to hold a tetrahedron geometric solid 120 (for example, a quartz crystal, a magnet, a prism etc.), or other geometric solid 120. Each vertex saddle 130 can be configured to receive a vertex of a geometric solid 120. Alternatively, a vertex saddle 130 can be configured to receive vertices of two or more geometric solids that are in contact with each other. Each edge strut 140 can be configured to couple with one or more of the vertex saddles 130 to thereby form a modular frame 110. It is also contemplated that a portion of the modular frame 110 can be configured to support or at least partially enclose a culet of a geometric solid. In some embodiments, the modular frame 110 can couple with one or more of other modular frames and a base or support 150 as illustrated. A base 150 can include a secondary support acceptor 160 which allows a user to affix the base at a desired location in a desired orientation via a secondary support (not shown). Such a secondary support can be rigid, pliant, or include both rigid and pliant portions. It should be noted that although the geometric solid 120 is presented as having acute vertices, the disclosed devices and methods can also apply to obtuse vertices. Edge struts and vertex saddles of the inventive concept can be formed from any suitable material including, but not limited to, polymers, metals, wood, ceramics, stone, and rubber, alone or in combination.

It should be appreciated that modular frame 110 provides several benefits. First, frame 110 securely holds a geometric solid 120 by one or more of saddle(s) 130 fitting closely around the vertices of the geometric solid 120, simultaneously providing both support and protection for these easily damaged sites. Secondly, frame 110 further protects the edges of a geometric solid 120 by placing one or more strut(s) 140 over the edges of geometric solid 120. Thirdly, elements of frame 110 can easily be combined with other frames, saddles, or struts to permit the construction of compound or super structures as discussed below. Finally, the elements of the modular frame 110 can easily be added to or reconfigured, permitting the modular frame 110 to accommodate solids with a variety of geometric shapes and sizes.

The term "educational geometry" should be construed broadly to mean any commercially suitable geometrically shaped object including a quartz or other crystal, a metallic or semi-metallic geometric shaped object, a magnet, a lens, a prism, or a stone. In one embodiment of the inventive concept an educational geometry can include a regularly shaped crystalline polyhedron (e.g., tetrahedron, cube, octahedron, etc.).

Figure 2A:
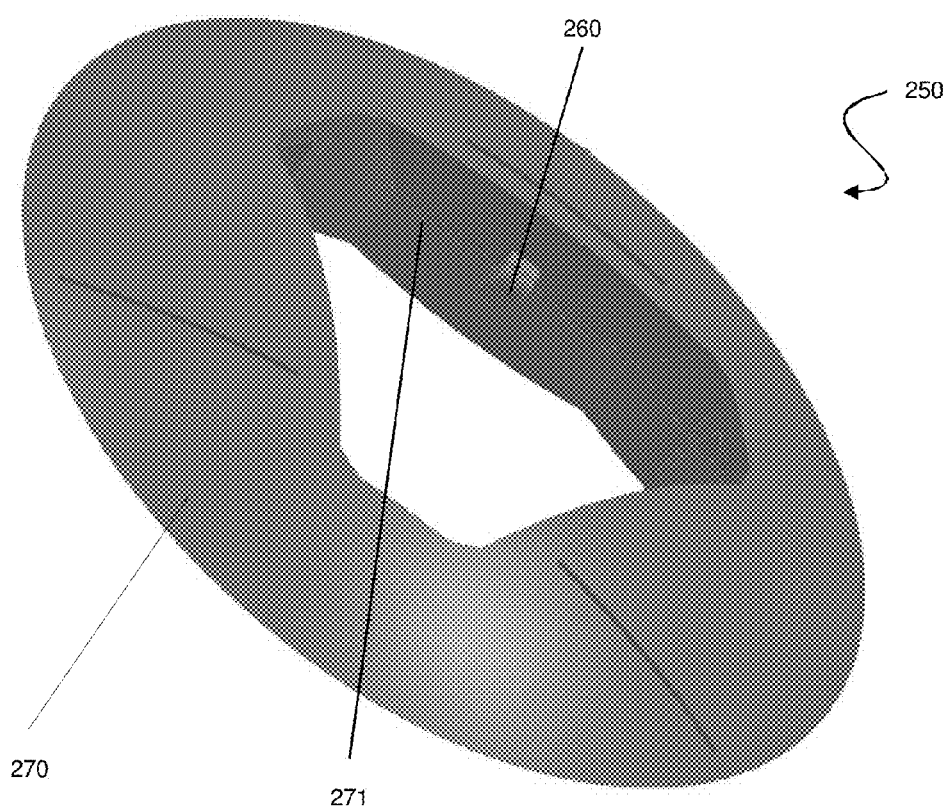
FIG. 2A is a perspective view of an embodiment of a base of the inventive subject matter.
Figure 2B:
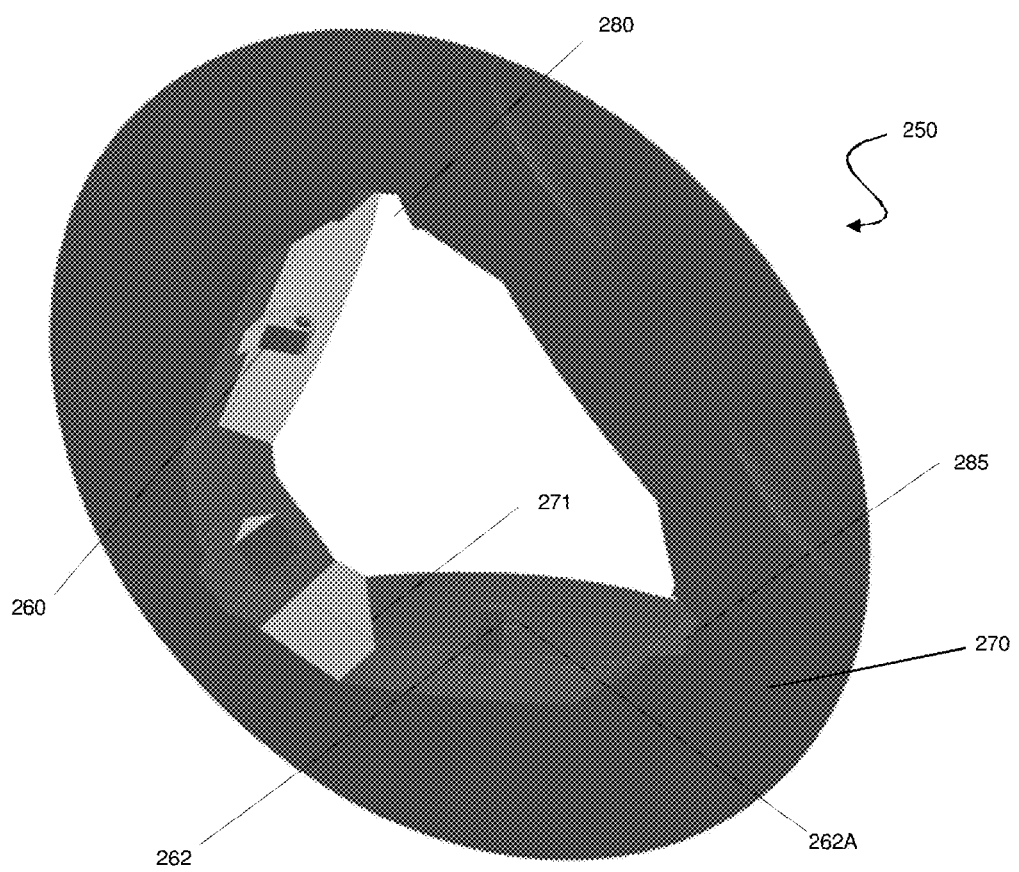
FIG. 2B is another perspective view of the base of FIG. 2A.

FIGS. 2A and 2B show perspective views of a base 250 of the inventive subject matter. As shown, a base 250 can be configured to releasably or reversibly couple with edge struts of a frame via one or more couplers 260, 262 along a portion of the base surface that are complementary to one or more couplers of a modular frame (e.g., of a strut or a saddle, etc.). Such a portion of the base surface can be any portion of an outer surface 270 or any portion of an interior surface 271. In some embodiments, the base can be a solid piece of material (i.e., lacking an aperture) only having an outer surface. FIG. 2B (from a different perspective) shows that a base 250 can include indentations 280, 285 that are sized and dimensioned to receive at least a portion of an edge of a geometric solid or object. In such an embodiment, indentations 280, 285 are each sized and dimensioned to each receive a truncated edge of a geometric (in this instance tetrahedral) solid. It should be appreciated that a base can comprise any suitable number of indentations of any suitable size and dimension such that the base can receive and secure geometric solids of various sizes and shapes.

Coupler(s) 260 associated with a base 250 can include a portion of a multi-component fastener. In some embodiments of the inventive concept, couplers 260, 262 can each comprise a first component of a fastener, and an edge strut or vertex saddle can comprise a second, complementary component of the fastener. For example, a coupler 262 associated with a base 250 can include a first protrusion 262A on a first side, and a second protrusion on a second, opposing side (not shown in this view). Such protrusions can be configured to be complementary with a depression of an edge strut, thereby permitting via a snap fit connection. It is further contemplated that a coupler 260 of base 250 can include one portion of a three or more part fastener, wherein one coupler is configured to fit with at least two other complementary components.

Figure 2C:
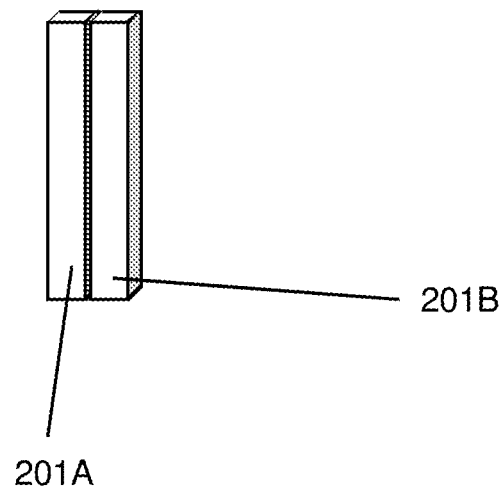
FIG. 2C is a schematic of an embodiment of a fastener of the inventive subject matter.
Figure 2D:
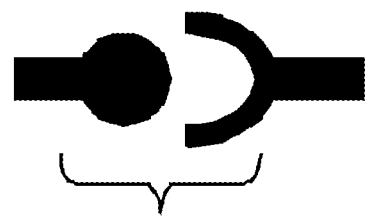
FIG. 2D is a schematic of another embodiment of a fastener of the inventive subject matter.
Figure 2E:
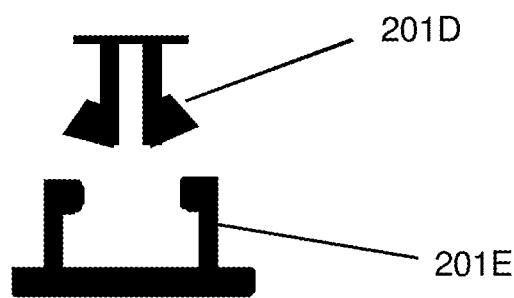
FIG. 2E is a schematic of yet another embodiment of a fastener of the inventive subject matter.

Each coupler or complementary coupler can be located along any portion of a modular frame (e.g., saddle, strut) or base. All commercially suitable types of couplers and fasteners are contemplated including those shown in FIG. 2C-2E. For example, a fastener can comprise complementary magnetic couplers 201A, 201B, chemical couplers, hook/loop couplers, ball-snap fasteners 201C, male and female couplers 201D, 201E that snap fit together, or any other commercially suitable fasteners and couplers. As shown, a fastener can comprise a first coupler on a first component (e.g., a strut, base, saddle, etc.), and a second coupler on a second component, wherein the second coupler is complementary to the first coupler.

Figure 3:
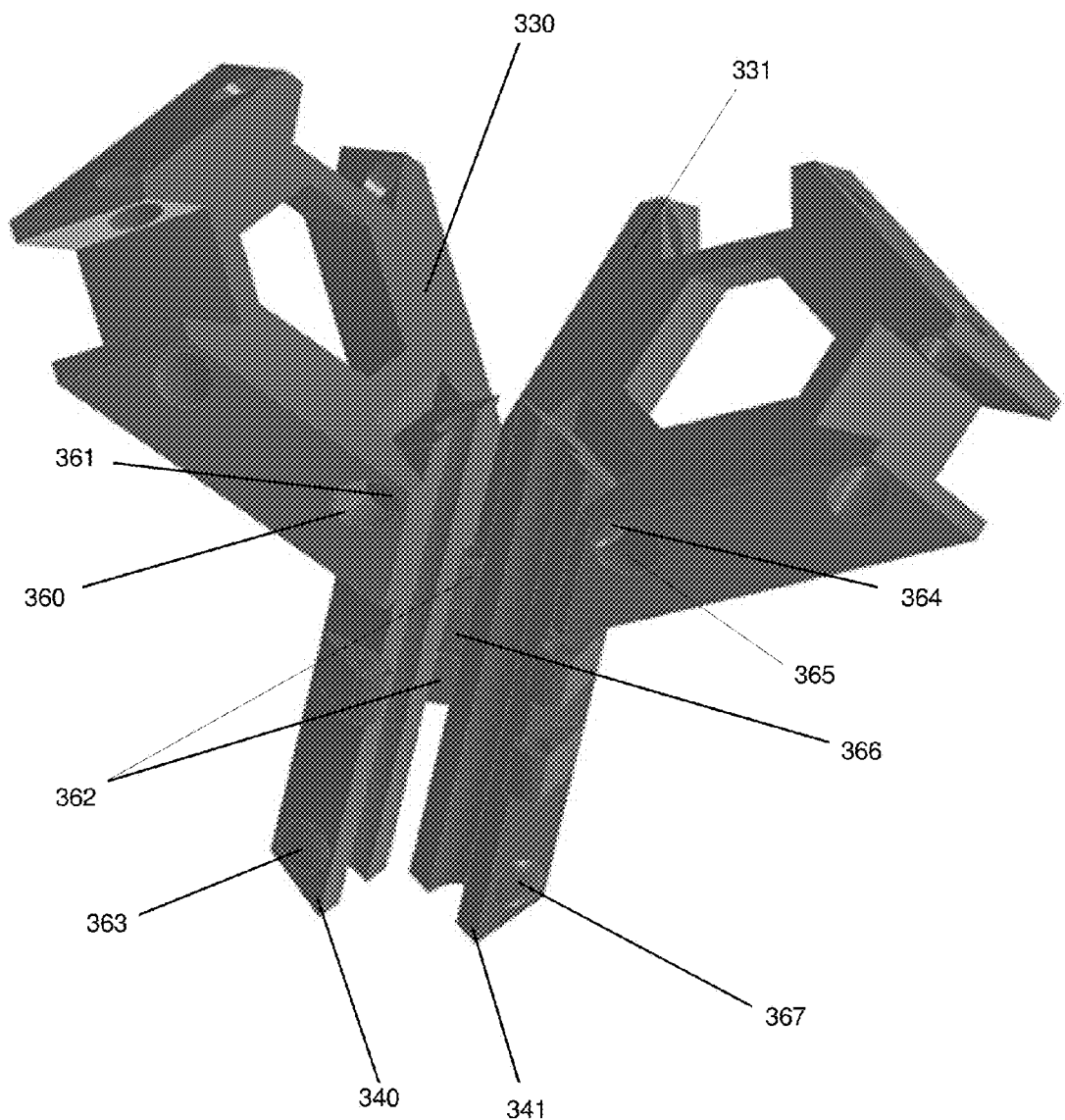
FIG. 3 is a partial view of an embodiment of a modular frame of the inventive subject matter having two sub-frames coupled together via edge struts.

FIG. 3 provides a detailed view of one way in which edge struts 340, 341 can couple to one another and with first and second vertex saddles 330, 331. For example, a first strut 340 can include a first coupler 361, a second coupler 362, and a third coupler 363. As shown, the first coupler 361 can include two protrusions on opposing sides of first strut 340 that are sized and dimensioned to mate with first complementary coupler 360 of first saddle 330, which comprises two depressions (e.g., holes, recesses, etc.). A second coupler 362 includes two protrusions, each of which has a depression sized and dimensioned to mate with a fifth coupler 366 of a second strut 341. A third coupler 363 can be coupled to a different saddle, strut, or a base of the inventive subject matter. A second strut 341 can similarly include a fourth coupler 364, a fifth coupler 366, and a sixth coupler 367. Accordingly, a fourth coupler 364 can include two protrusions on opposite sides of second strut 341 that are sized and dimensioned to mate with a complementary coupler 365 of a second saddle 331, which includes two depressions. A fifth coupler 366 includes two depressions that are configured to mate with two protrusions on two separate prongs of the second coupler 362 via a snap fit, as described above.

It is further contemplated that first saddle 330 and first strut 340 can include a portion of a first sub-frame configured to hold a geometric solid or shape, and a second saddle 331 and second strut 341 can comprise a portion of a second sub-frame configured to hold a different geometric solid or shape. In some embodiments of the inventive concept these two sub-frames can be coupled together via second and fifth couplers of first and second struts 340 and 341, respectively, to construct an extended modular frame structure (or superstructure) that can support a plurality of geometric solids or shapes (which can be dissimilar) at defined positions and orientations relative to one another.

It should be noted that while the above example focuses on fasteners comprising a snap fit mechanism, all suitable fasteners are contemplated, including, but not limited to, magnets, screws, clips, hook and loop fasteners, or adhesives.

Figure 4A:
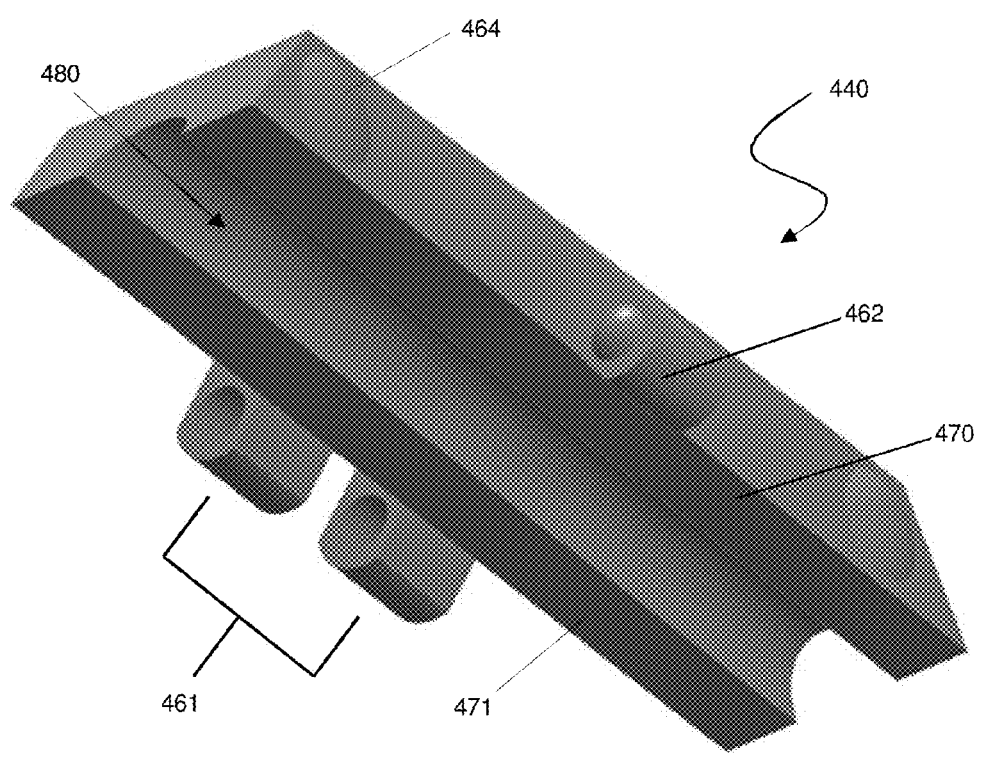
FIG. 4A is a perspective view of an embodiment of an edge strut of the inventive subject matter.
Figure 4B:
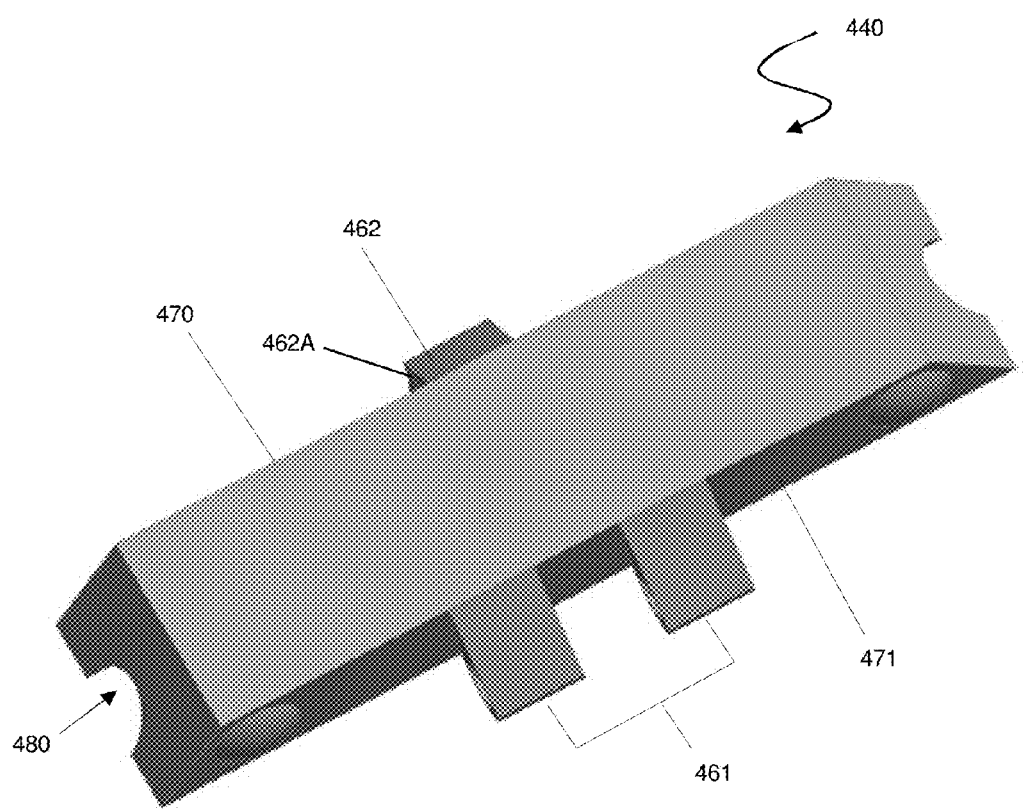
FIG. 4B is another perspective view of the edge strut of FIG. 4A.

FIGS. 4A and 4B illustrate two views of an edge strut 440 of the inventive concept. It should be noted that the edge strut can include both a single-pronged coupler 462 that can be positioned adjacent to first side 470, and a double-pronged coupler 461 that can be positioned adjacent to second side 471. This permits a user to couple numerous sub-frames together via a coupling of edge struts. It is also contemplated that such sub-frames can be coupled to one another via (1) an edge strut of a first sub-frame and a vertex saddle of a second sub-frame, (2) a vertex saddle of a first sub-frame and a vertex saddle of a second sub-frame, or (3) any other commercially suitable coupling of any other components of sub-frames. Further, the struts can include couplers 464 at end portions, which can reversibly mate with the vertex saddles of the inventive subject matter.

Figure 4C:
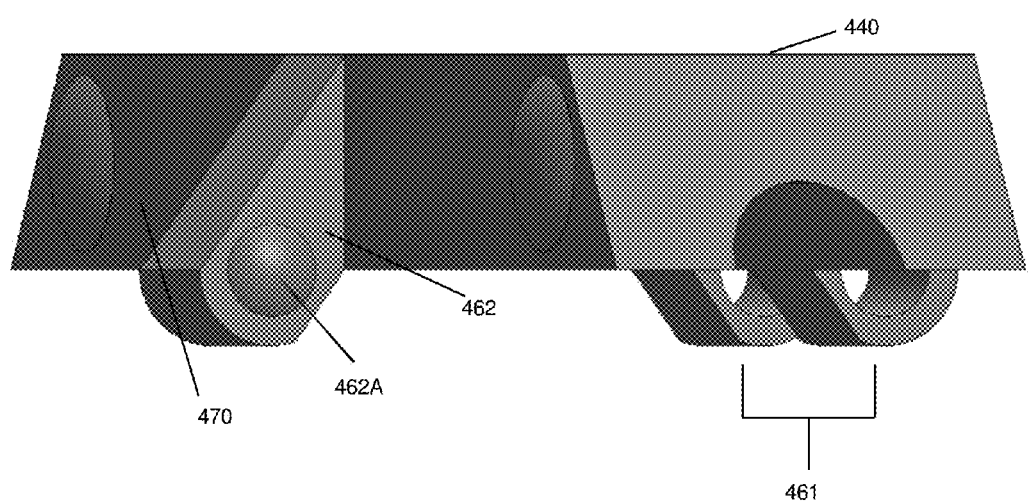
FIG. 4C is yet another perspective view of the edge strut of FIG. 4A.

FIG. 4C provides another view of edge strut 440. Shown in this view, a coupler 462 on a first side 470 can include one or more protrusion(s) 462A, which can in turn couple with a depression of another edge strut or a vertex saddle. Two pronged coupler 461 of second side 471 includes two depressions on each prong (or one through-hole on each prong as shown), which are sized and dimensioned to accept a complementary coupler of another edge strut or vertex saddle.

It should appreciated that a strut can include a through channel 480 that is configured to cover at least a portion of an edge of a geometric solid or shape, which greatly reduces the risk of chipping or other types of damage to the secured object. A through channel of the inventive subject matter can be of any suitable shape, size, and cross section, including for example, a half-pipe, a trapezoid, a rectangle, or a triangle. In some embodiments of the inventive concept the cross section of a through channel can vary along its length. Non-through channels are also contemplated wherein one or both edge portions can comprise a stop.

Figure 5A:
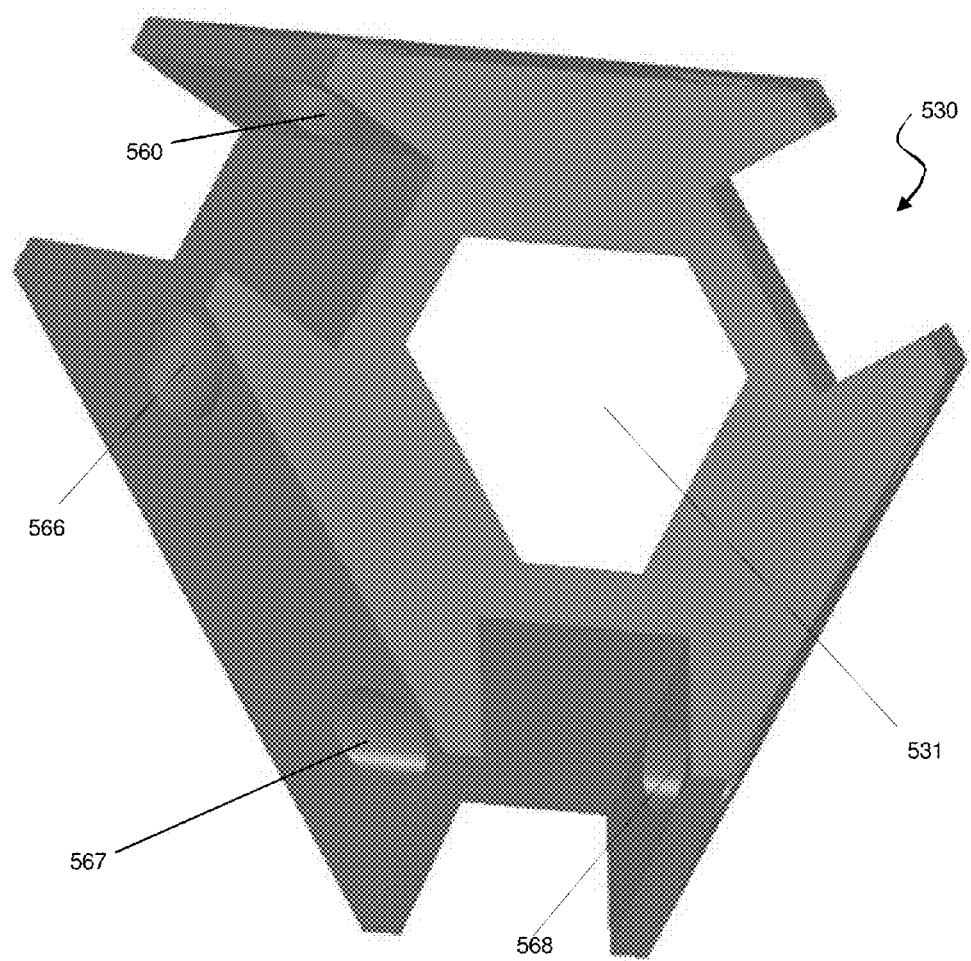
FIG. 5A is a perspective view of one embodiment of a vertex saddle of the inventive subject matter.
Figure 5B:
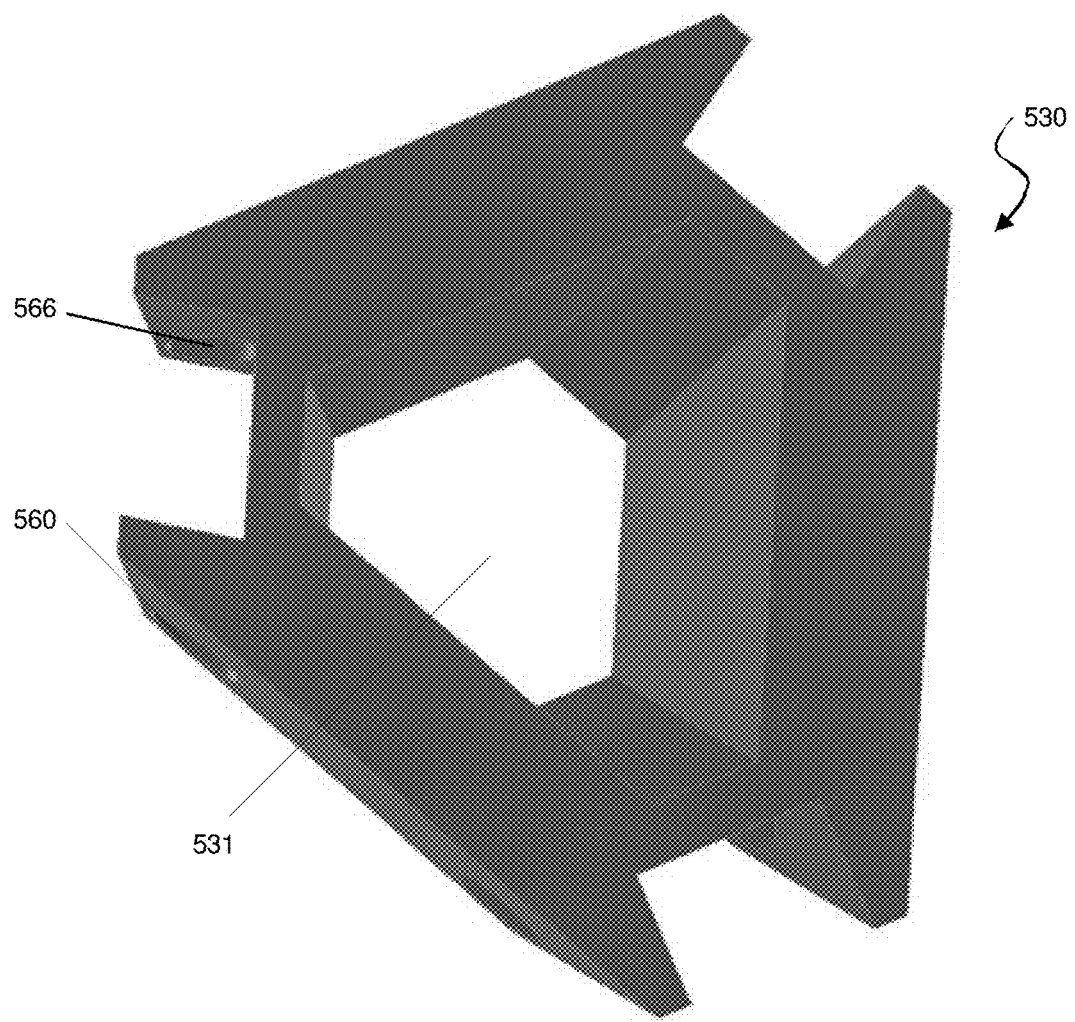
FIG. 5B is another perspective view of the vertex saddle of FIG. 5A.
Figure 5C:
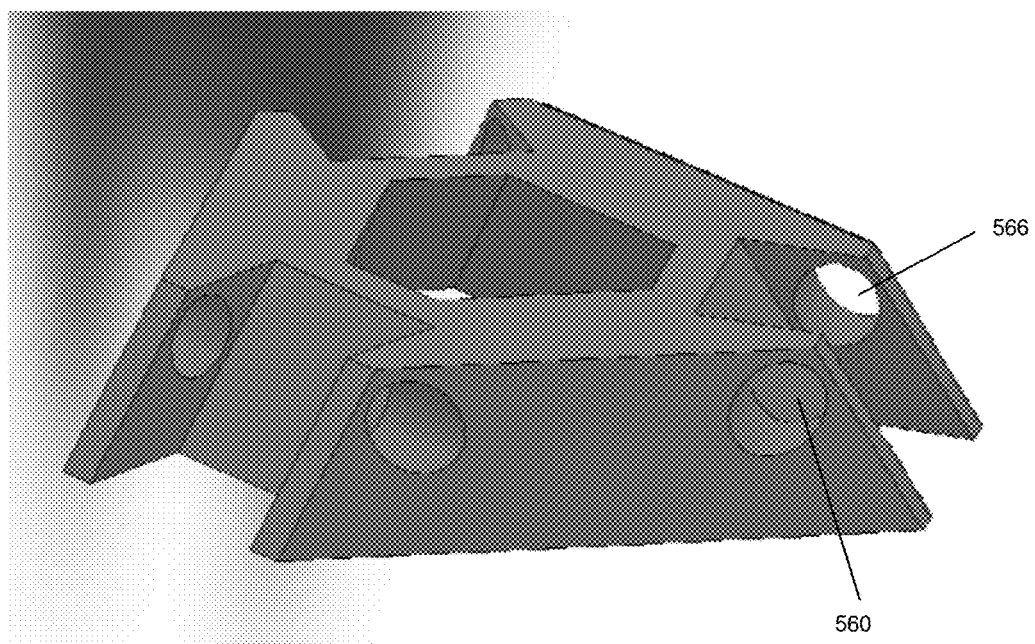
FIG. 5C is yet another perspective view of the vertex saddle of FIG. 5A.

FIGS. 5A and 5B present more views of one embodiment of a vertex saddle 530 of the inventive subject matter. It is contemplated that such a saddle can include at least one opening 531 capable of receiving a vertex or any other suitable portion of a geometric solid or shape. Although opening 531 is presented as having six sides configured to receive a vertex of a tetrahedral solid or shape, one should appreciate that opening 531 can have sides complementary to the vertex it is configured to receive. For example, a vertex configured to receive an octahedron could include an opening 531 with eight sides (i.e., four sides for the faces or the vertex plus four sides for the edge struts). Saddle 530 can also include couplers 560, 566, 567, 568, which can be configured to allow a coupling of such saddle 530 with a complementary coupler of a strut, a base, or a saddle of the inventive subject matter. FIG. 5C is another view of a vertex saddle 530, which provides a view that illustrates that at least some of the couplers can include through-holes configured to receive protrusions of complementary couplers.

Figure 6:
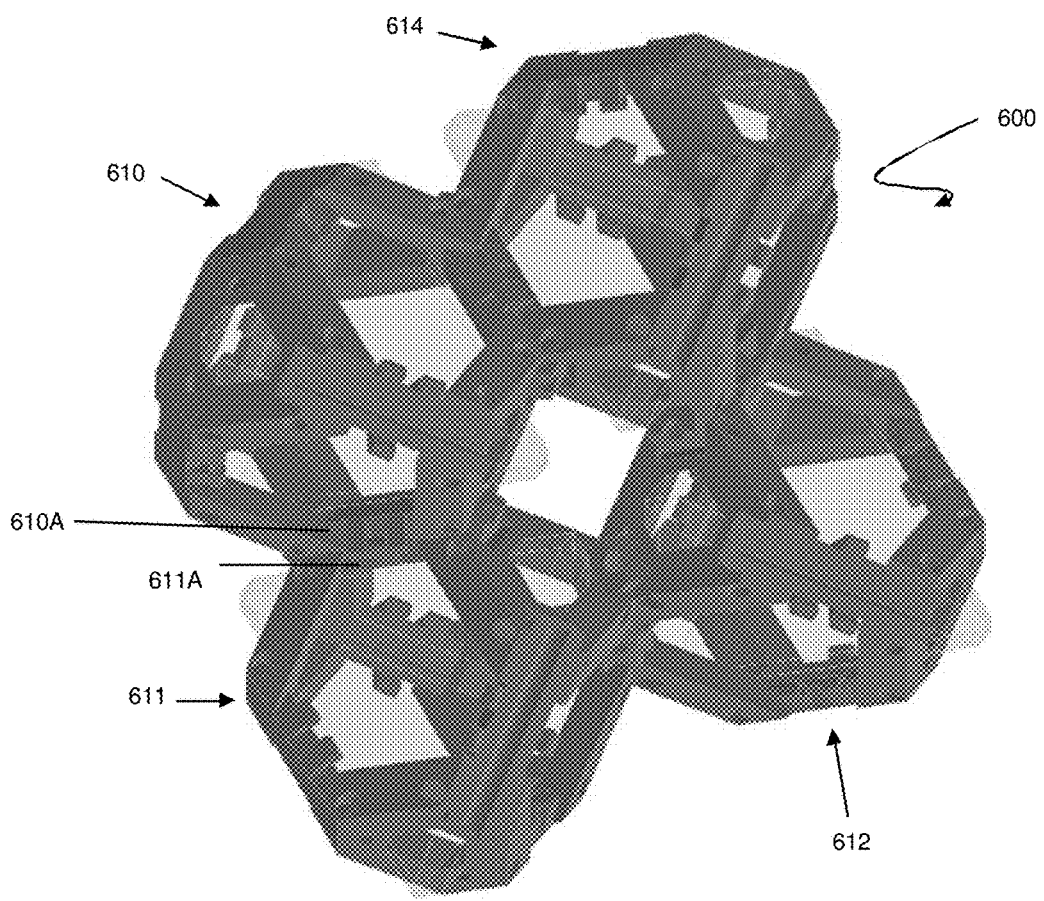
FIG. 6 is a perspective view of an embodiment of a modular frame of the inventive subject matter having four sub-frames.
Figure 7:
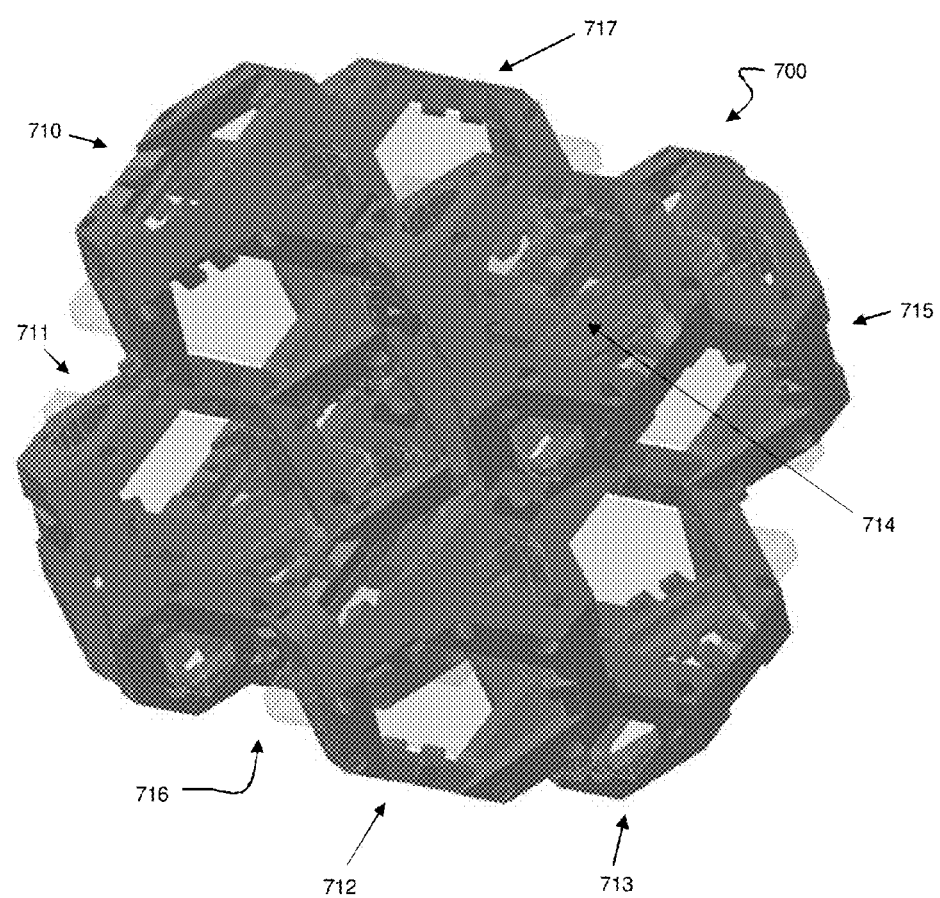
FIG. 7 is a perspective view of an embodiment of a modular frame of the inventive subject matter having eight sub-frames.

It should be appreciated that a modular frame of the inventive subject matter advantageously allows multiple sub-frames to be coupled with one another to create more complex geometries. An example is shown in FIG. 6, which shows sub-frames 610, 611, 612, 613 coupled together to form a larger modular frame 600 as an extended or super structure. Such extended or super structures permit a user to control relative position and orientation of geometric solids or shapes secured by the individual sub-frames, and thereby determine or observe interactions between them or cumulative effects. Such a stable, yet readily reversible and easily rearranged assembly is particularly advantageous for instructional use. As shown, sub-frame 610 is coupled to sub-frame 611 via edge struts 610A, 611A. Similarly, sub-frames 611, 612 are coupled to one another via struts of sub-frames 611, 612; sub-frames 612, 614 are coupled to one another via struts of sub-frames 612, 614. In addition, sub-frames 614, 610 are coupled to one another via their respective struts. An alternative super structure configuration is shown in FIG. 7, which depicts a modular frame 700 composed of a set of sub-frames 710, 711, 712, 713, 714, 715, 716, 717 that can be configured to hold various geometric shapes having the same, similar, or dissimilar geometries.

In some embodiments, the geometric solids (for example, crystals, magnets, lenses, prisms, and so on) can include one or more additional features. In such an embodiment the geometric solids could, for example, have a preferred axis or pole (e.g., a C-axis, a Z-axis), which could optionally be used to influence how components of a modular frame is to be arranged. More specifically, a crystalline solid could have a preferred axis based on its refractive index, chirality, crystal lattice structure, polarization orientation, magnetic moment, or other features related to the composition or internal arrangement of the geometric solid. In some embodiments the geometric solid can include an indication (e.g., a marking, dot, indicia, etc.) that informs a user of the orientation of such a preferred axis or pole relative other orientations. Further, especially in embodiments where the geometric solid includes a crystal, such a crystal can include additional indicia, including a serial number, a name, a manufacturer, a logo, an orientation relative to a parent crystal, a location relative to a parent crystal or block from which the crystal was cut, or other information.

Modular frames of the inventive subject matter can comprise any suitable number of sub-frames, struts, saddles, couplers, fasteners and bases. For example, a modular frame can comprise: 0, 1, 5, 10, 15, or even 20 or more sub-frames; 0, 1, 5, 10, 15, 25 or even 50 or more struts; 0, 1, 5, 10, 15, 20 or even 50 or more saddles; 0, 1, 15, 20, 35, or even 100 or more couples; and 0, 1, 5, 10, 15, or even 20 or more bases.

Figure 8:
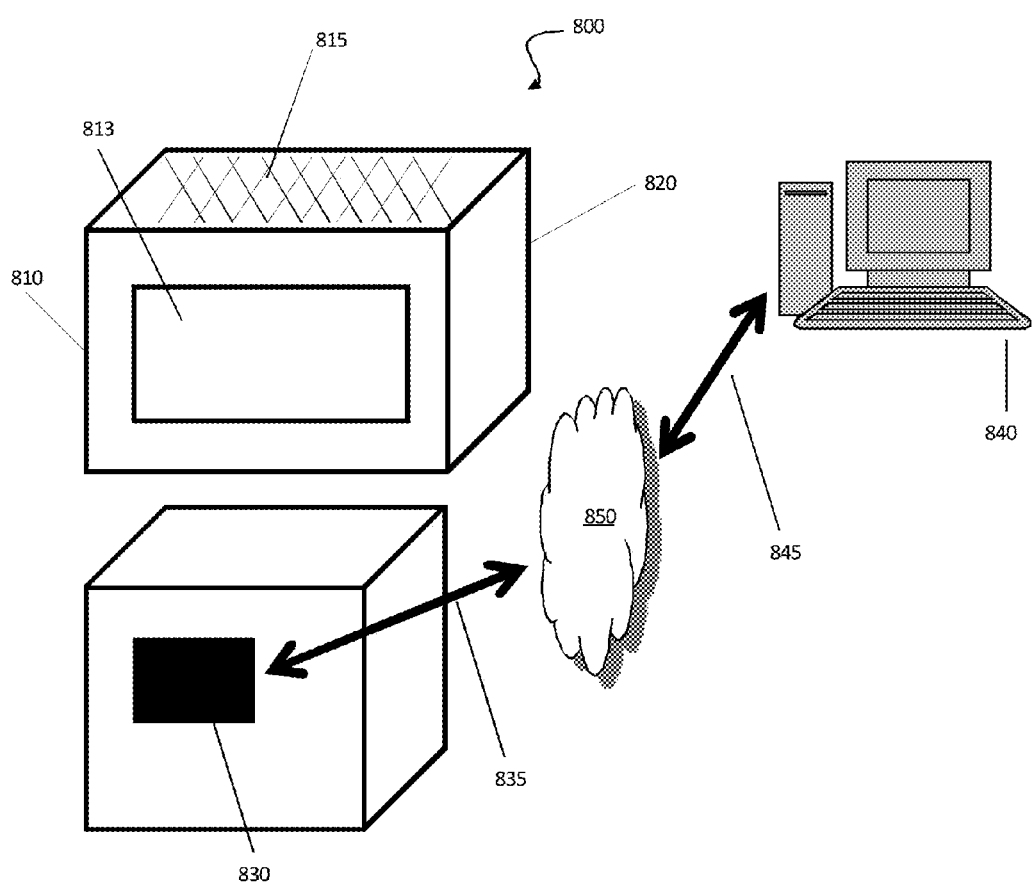
FIG. 8 depicts an embodiment of container of the inventive subject matter.

FIG. 8 shows another aspect of the inventive subject matter comprising a container (800) configured to at least partially enclose at least one of the geometric solids or modular frames of the inventive subject matter. In some embodiments, the container 800 can include a lid 820 and bottom 810, one or both of which can include a conductive material (e.g., copper, silver, aluminum, conductive polymer, etc.). In some embodiments of the inventive concept such conductive material can cover all or part of the lid 820 or bottom 810 of the container 800. For example, the conductive material can cover the entire exterior surfaces of the lid 820 and bottom 810.

In some embodiments, the outer surface of the container 800 can be partially or completely formed or covered by conductive plates 813 or by a conductive mesh 815. When such a container 800 is partially or completely closed, the container 800 can advantageously provide a Faraday cage around at least a portion of the contents of the container 800. Still further, the container 800 can include or be coupled to one or more circuits 830 configured to detect electromagnetic energy via the Faraday cage. In some embodiments of the inventive concept such detected electromagnetic energy can be encoded as digital data and subsequently communicated 835 over a network 850 via a wired or wireless connection. Such a network 850 can communicate 845 such digital data to one or more local or remote computing device(s) 840 (e.g., a mobile phone, a tablet, a laptop computer, a desktop computer, etc.), allowing one or more users to rapidly and conveniently access such data, advantageously supporting distance learning activities.

Other embodiments of the inventive subject matter include alternative or additional modular frames and modular devices in which frame elements and frames are combined.

Some embodiments of modular frames could include a first sub-frame component and a second sub-frame component, wherein the first component comprises one or more vertex saddles, frame arms and couplers. The second component could comprise couplers complementary to those of the first component, such that the first and second components could releasably mate with one another. In some embodiments, complementary couplers compose a clasp. In embodiments where modular devices having two or more modular frames are provided, two or more frames having a structure as described above could be coupled to one another via one or more clips. Two or more of the modular frames could each comprise one or more clip receiving portions that are sized and dimensioned to receive at least a portion of a shared clip. The clip receiving portions could be located along any suitable portions of a modular frame, including for example, a vertex saddle or a frame arm. The clip could comprise couplers (e.g., magnets, recesses, protrusions, snaps, balls, etc.) that are complementary to couplers of the clip receiving portions. Where a clip comprises protruding portions as couplers, it is contemplated that the clip could comprise a first width (e.g., a portion of the clip lacking protruding portions) and a second width (e.g., a portion of the clip including protruding portions), and that the first width could be smaller than a width of a clip receiving portion, while the second width could be greater than the width of the clip receiving portion. Where a clip comprises recessed portions as couplers, it is contemplated that the clip could comprise a first width (e.g., a portion of the clip including recessed portions) and a second width (e.g., a portion of the clip lacking recessed portions), and the first width could be smaller than a width of a clip receiving portion (e.g., where complementary protrusions would be), while the second width could be greater than the width of the clip receiving portion where complementary protrusions would be.

Figure 9A:
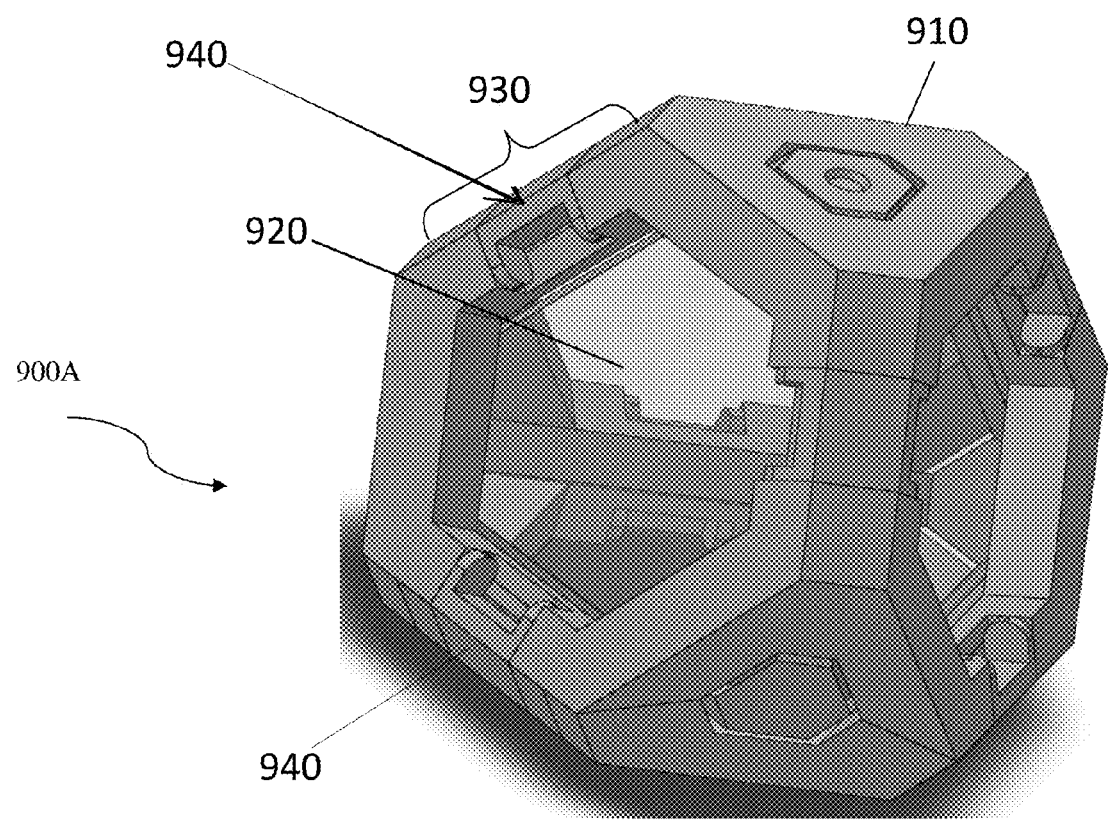
FIG. 9A is a perspective view of another embodiment of a frame of the inventive subject matter.

An example of an embodiment of a modular device is depicted in FIGS. 9A-9E. FIG. 9A shows a modular frame 900A assembled from components that include a vertex saddle (also referred to herein as vertex portion or vertex) 910, which can be shaped to support and protect a truncated vertex or other angled terminus of a geometric solid, and which extends into one or more frame arm 930 portions that are configured to protect an edge portion of a geometric solid. It should be appreciated that a vertex saddle could be sized and dimensioned to completely cover a vertex of a geometric solid, or could be sized and dimensioned to partially surround a vertex of the geometric solid, leaving a portion exposed. Frame arms 930 of adjacent vertex portions 910 can be joined using a clip 940. Additionally or alternatively, frame arm 930 could be coupled with a frame arm or other portion of a second modular frame (not shown in FIG. 9A). Two or more frame arms 930 or vertex saddles 910 could define a perimeter of a face 920 that exposes a portion of facet of the enclosed geometric solid. It should be appreciated that the configuration of the frame 900A and the face 920 could be defined by the angles and dimensions of the frame arm 930 relative to the vertex portions 910. Although depicted as being assembled from identical vertex/frame arm components, in some embodiments the frame can be constructed from different vertex/frame arm components, permitting the support and orientation of elongated or even asymmetrical geometric solids.

Figure 9B:
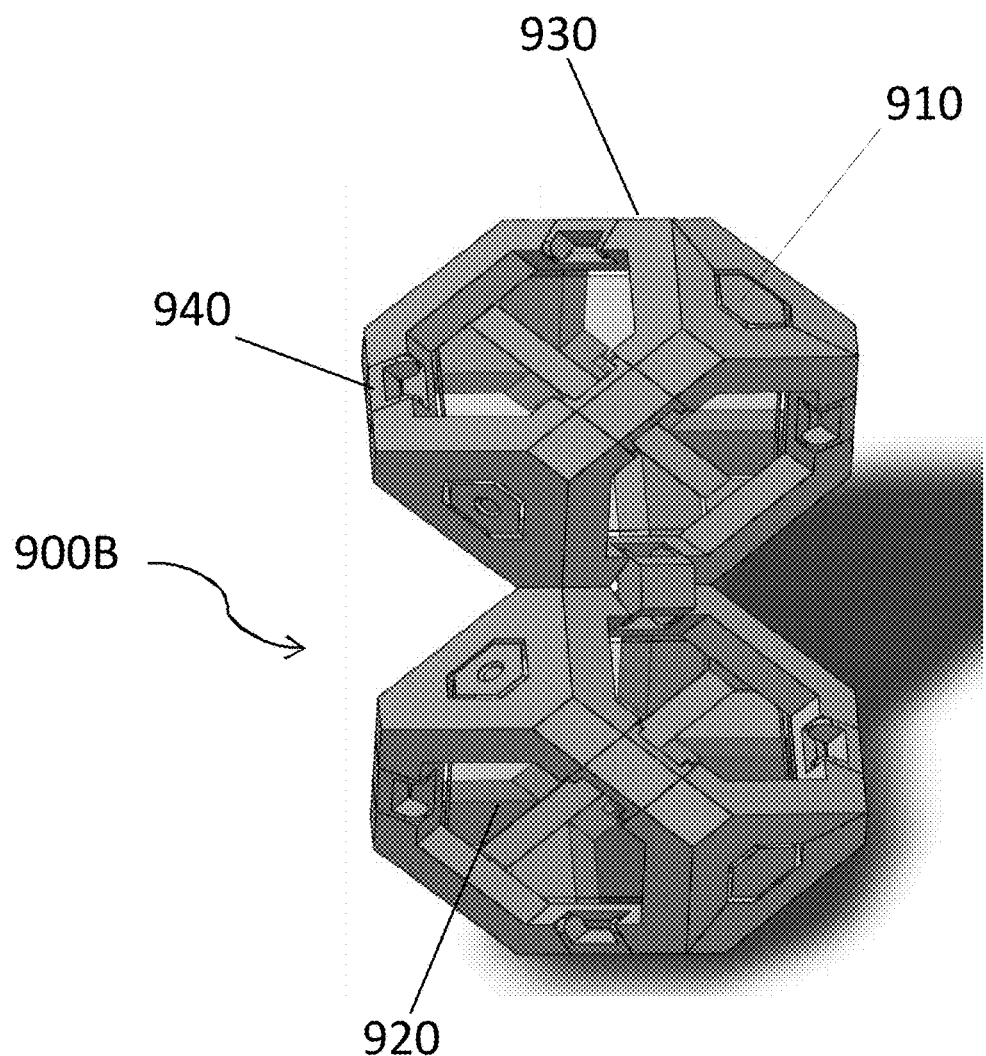
FIG. 9B is a side view of two frames of the inventive subject matter joined edge to edge.
Figure 9C:
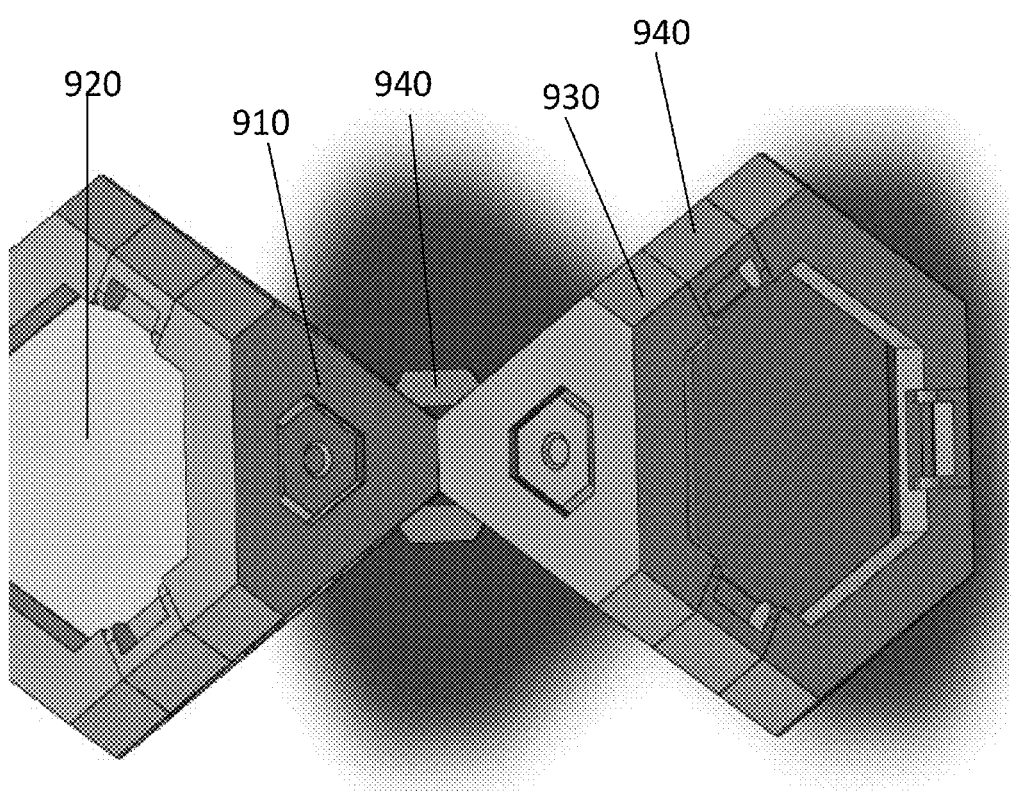
FIG. 9C is an enlarged view of two frames of the inventive subject matter joined edge to edge, showing the connection.
Figure 9D:
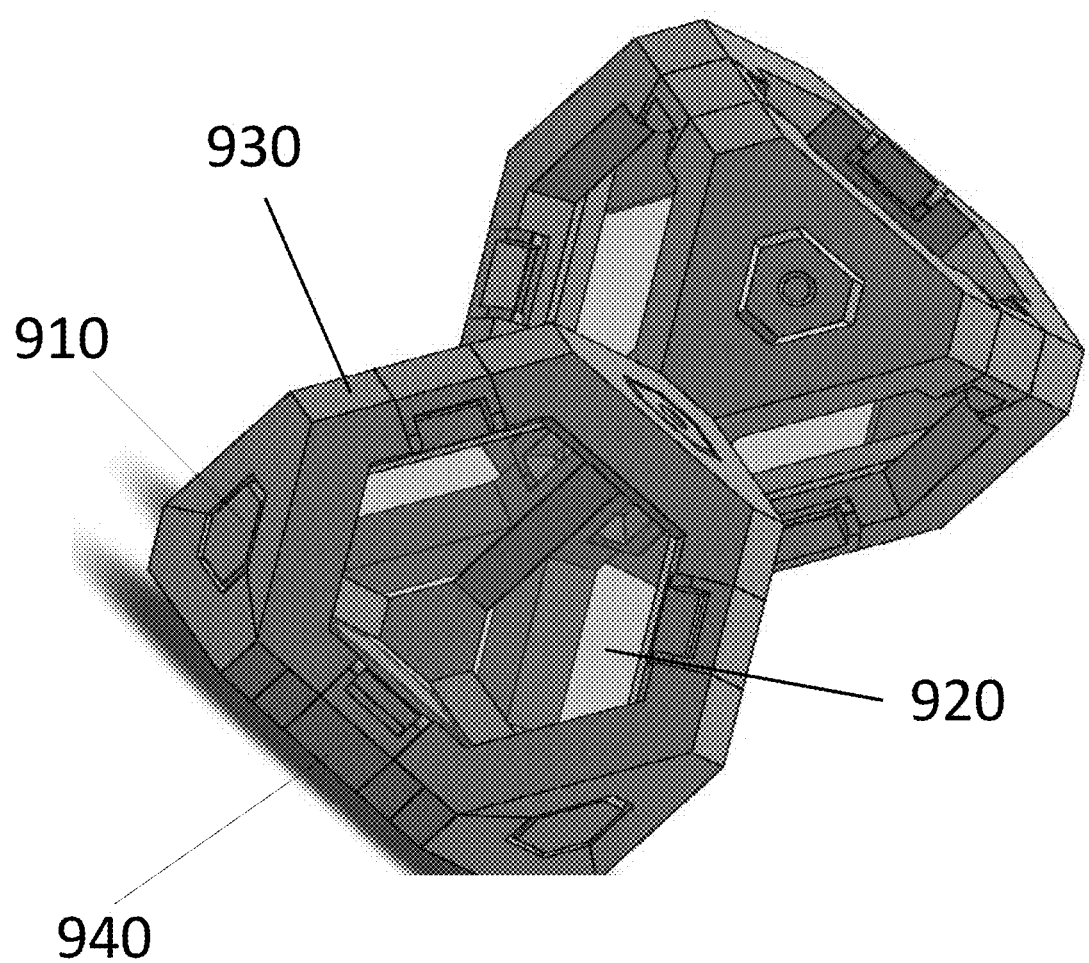
FIG. 9D is an overhead view of two frames of the inventive subject matter joined edge to edge.
Figure 9E:
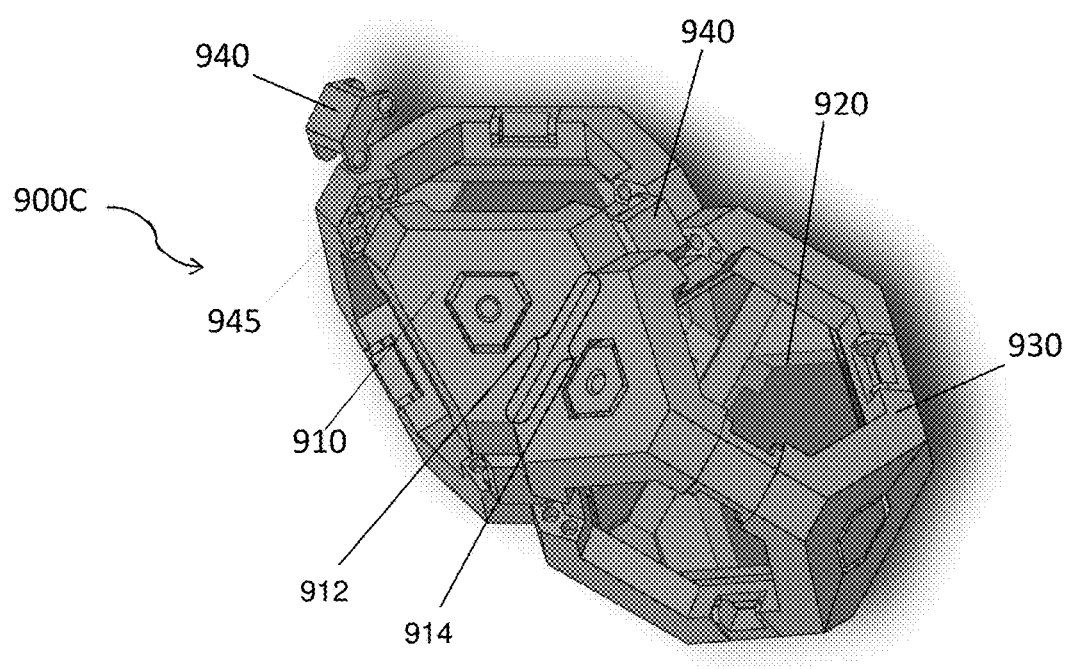
FIG. 9E is a perspective view of two frames of the inventive subject matter joined face-to-face.

As shown in FIG. 9B, such modular frames can be joined to form higher order structures. In such embodiments of the inventive subject matter the modular frames can be joined in different ways. FIG. 9B depicts a side view of two frames of simplified construction joined edge-to-edge. FIG. 9C shows a magnified view of such an assembly, and demonstrates the use of a clip 940 to join the two frames. Such a clip 940 can be identical to those that could be used (in some embodiments) to assemble the simplified frame. Alternatively, in some embodiments of the inventive subject matter a clip used to join modular frames can be different from those that could be used (in some embodiments) to assemble the modular frames. As shown in FIG. 9C, clip 940 could be sized and dimensioned to (1) fit snugly into a clip receiving portion, and (2) releasably lock two frames in an arm to arm configuration. Moreover, the clip could (3) releasably lock two frames in a face to face configuration, as shown in FIG. 9E. Where an arm to arm configuration is used (e.g., FIG. 9C), a clip receiving portion of a first frame could receive an end of two different clips, and a clip receiving portion of a second frame could receive an opposite end of two different clips. Where a face to face configuration is used (e.g., FIG. 9E), a clip receiving portion of a first frame could receive an end of one clip, while a clip receiving portion of a second frame receives an opposite end of the clip. A different clip receiving portion of the first frame could receive an end of a second clip, while a different clip receiving portion of the second frame receives an opposite end of the second clip. The two different clips used in a face to face configuration allows a long edge 912 of a first frame to lock in place aligned with a long edge 914 of the second frame. FIG. 9D depicts a top view of two modular frames joined edge to edge, showing the relative orientations of exposed faces 920 of the joined modular frames.

As shown in FIG. 9E, modular frames of the inventive subject matter can also be joined at their faces. FIG. 9E also demonstrates a way in which a clip 940 can fit within a clip interface 945 of the simplified modular frame. Such a clip interface 945 can include multiple insets or holes that provide sites that secure the clip 940 within the clip interface 945 and permit simple and secure joining of both simplified modular frame components and assembly of multiple modular frames. It is contemplated that clip 940 could be used in clip interface (also referred to herein as clip receiving portion or clip acceptor portion) 945, and could be similar or identical in shape and size to the clip interface (here a recessed portion of frame arm 930. Additionally or alternatively, clip 940 could be used to couple a first frame with a second frame. As shown, clip 940 comprises a first side having protrusions and a second side having protrusions. The protrusions of a first side couples with recesses of a first frame's clip interface, and a second side couples with recesses of a second frame's clip interface.

Figures 10A, 10B:
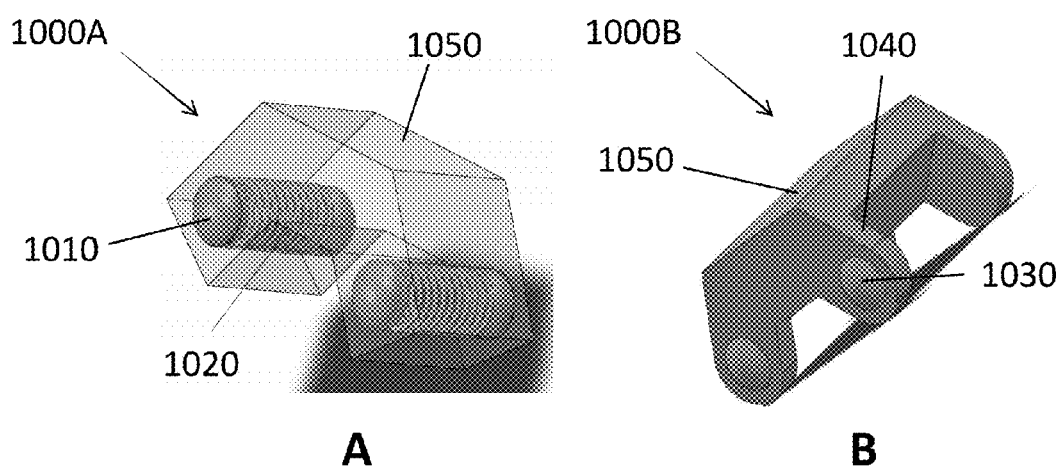
FIG. 10A and FIG. 10B depict clips of the inventive subject matter.

FIG. 10A and FIG. 10B show exemplary embodiments of clips of the inventive subject matter. Clips (and any other frame components) can be made from any suitable material, including for example, a metal (for example, aluminum, steel, spring steel, and titanium), synthetic polymers (for example, nylon, polypropylene, and cross linked polyethylene), natural polymers (for example, rubber, latex, vulcanized rubber), or combinations of these. FIG. 10A depicts a spring clip 1000A, in which a spring 1020 provides a force that impels a ball 1010 or similar component into a clip interface (or a portion thereof). In order to permit joining of modular frames and modular frame components a spring clip 100A can support two or more such spring/ball assemblies joined by a bridge 1050. In some embodiments the bridge 1050 can be flexible in order to facilitate installation of the spring clip 1000A. It should be appreciated that a spring/ball assembly could alternatively or additionally be provided on a frame of the inventive subject matter, and that a complementary clip could comprise a recessed portion or hole. An alternative embodiment of a clip is shown in FIG. 10B, which depicts a tension clip 1000B. A tension clip 1000B utilizes a protrusion 1030 that is mounted on or formed into a flexible arm 1040, which provides force that impels the protrusion 1030 of the clip (or a portion thereof). A flexible arm can be made of thin material (for example, 20 mm, 15 mm, 10 mm, 8 mm, 5 mm, or even 0.5 mm or less in thickness) in order to achieve the desired flexibility. In order to permit joining of modular frames and modular frame components a tension clip 1000B can include multiple flexible arm/protrusion assemblies joined by a bridge 1050. Such a bridge 1050 can be flexible in order to facilitate installation of a tension clip 1000B. In a preferred embodiment of the inventive subject matter, spring clips are used in areas subject to frequent disassembly and reassembly, whereas tension clips are used in areas that are rarely disassembled.

It should be appreciated that the ability to join multiple simplified modular frames in a variety of ways permits the construction of a wide variety of higher order structures, advantageously allowing them to be used in a variety of educational roles. While such higher order structures permit studies of the interactions between geometric solids, they also permit demonstration of the effects of local geometry on the overall shape of such higher order structures. An example of this is shown in FIG. 11A, which depicts a structure formed by the face-to-face joining of ten simplified modular frames.

The helical structure 1100 thus produced can be used, for example, to demonstrate the additive effects angled subunits in nature, such as the DNA helix, RNA hairpin structures, and alpha helices observed in proteins. It should be appreciated that frames with different geometries, for example representing different chemical subunits, can be included to aid in visualizing the effects in naturally occurring polymers. As shown in FIG. 11B, which provides a magnified view of a portion of the structure shown in FIG. 11A, the angles between adjacent modular frames 1110, 1120, and 1130 are readily observable, which may not be the case in conventional molecular representations.

Figure 11A:
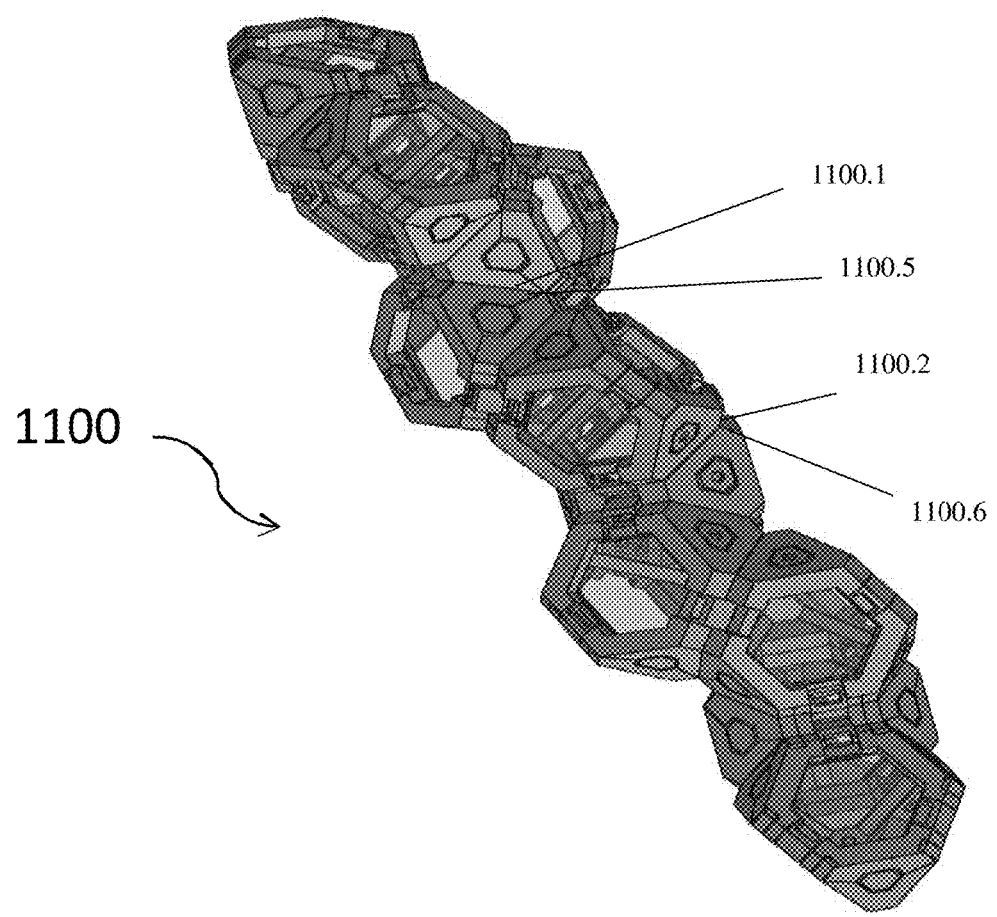
FIG. 11A shows a perspective view of 10 frames joined face-to-face, showing a characteristic helical pitch.
Figure 11B:
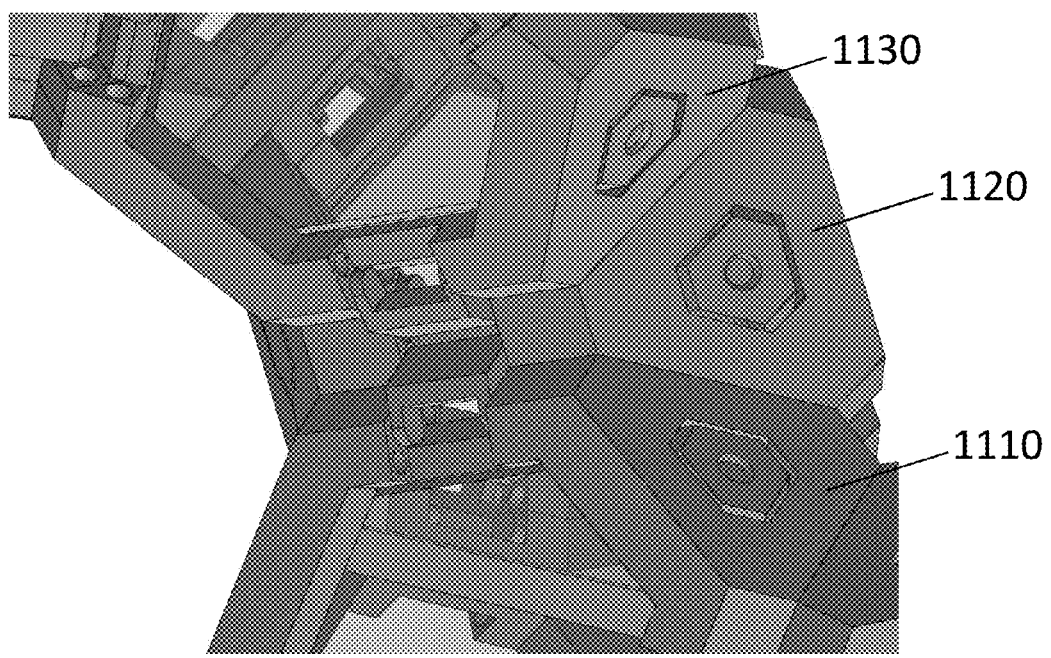
FIG. 11B shows a magnified view of a portion of the assembly of FIG. 11A.

As illustrated in FIGS. 11A and 11B, a "face to face" joining of modular frames configured to hold a substantially tetrahedral geometric solid could comprise a joining wherein a long edge 1100.1 of a first frame's vertex saddle abuts a long edge 1100.5 of a second frame's vertex saddle. In such embodiments, an "edge to edge" joining of modular frames configured to hold a substantially tetrahedral geometric solid could alternatively comprise a joining wherein a short edge 1100.2 of a first frame's vertex saddle abuts a short edge 1100.6 of a second frame's vertex saddle.

Figure 12A:
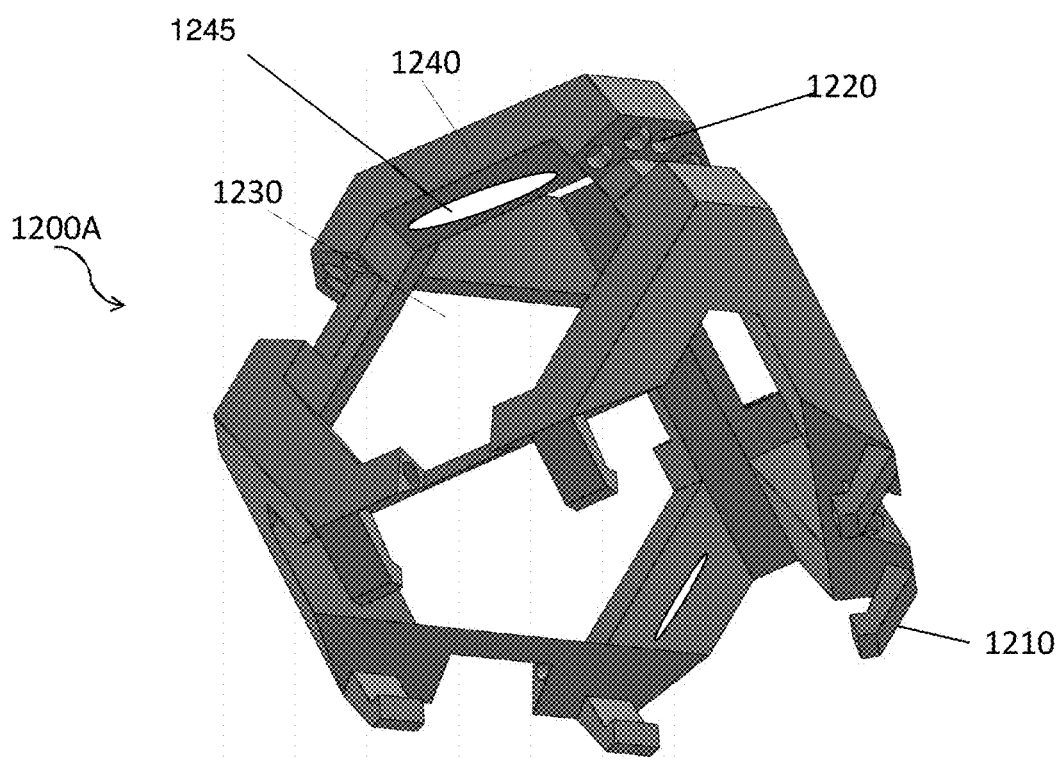
FIG. 12A shows a perspective view of a top portion of a two-part frame of the inventive subject matter.
Figure 12B:
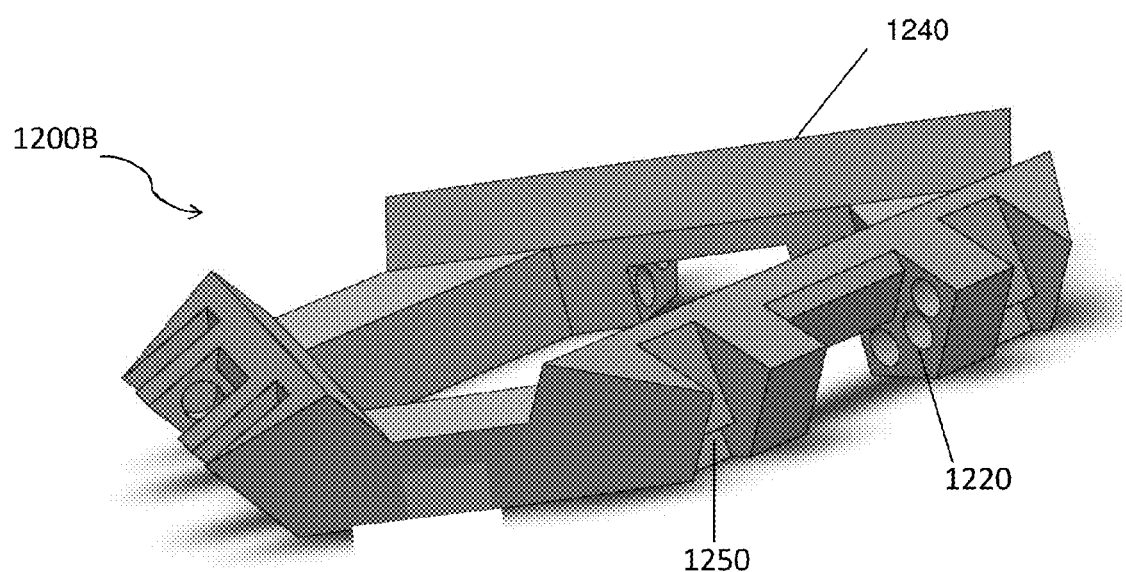
FIG. 12B shows a perspective view of a base (bottom) portion of a two part frame of the inventive subject matter.

Yet another embodiment of the inventive subject matter is a two part modular frame. Such a modular frame embodiment simplifies assembly and can be of particular utility in a home setting. FIG. 12A depicts an exemplary top portion 1200A of such a two part modular frame. As shown, the top portion 1200A can include multiple faces 1230 as defined by frame arms 1240, and also include one or more clip interfaces 1220 that permit joining to other modular frames. The top portion 1200A can also include one or more clasps 1210 or other couplers (e.g., couplers complementary to a bottom portion's couplers). These clasps 1210 could provide attachment to a bottom portion such as is depicted in FIG. 12B. Top portion 1200A or any other portion of a modular frame could comprise a rubber, silicon, foam, or other padding 1245 material configured to at least one of (1) prevent a sliding of a geometric solid within a frame, and (2) protect a geometric solid from damage. Where included, the padding could be provided in portions of an inner surface of a frame. Additionally or alternatively, the padding could be provided as a lining to an interior surface of an entire frame. As shown, the bottom portion 1200B can include at least one bottom catch 1250 (or other coupler), which serves as an interaction site for the clasp 1210 of the top portion 1200A of the two part modular frame. It should be appreciated that a modular frame of the inventive subject matter could comprise more than two portions or components. For example, a modular frame could comprise a top portion, bottom portion, and one or more mid-portions. In such embodiments, a top portion could include couplers complementary to those of a first mid-portion, the first mid-portion could comprise couplers complementary to those of a second mid-portion, and the second mid-portion could comprise couplers complementary to those of a bottom portion.

The bottom portion 1200B can also include one or more frame arms 1240 and clip interfaces 1220 that permit attachment to other modular frames. Although the two-part frame depicted shows a top portion with multiple faces and a vertexes and a bottom portion with a single face and no vertex, it should be appreciated that the portions of a two-part modular frame can each have multiple faces and one or more vertexes, as is convenient for manufacture and assembly.

Assemblies of modular frames of the inventive subject matter can incorporate modular frames of different shape, dimension, and design. For example, a modular device could comprise multiple modular frames having the same or different shapes, dimensions or designs. Similarly, in assemblies that include clips, the same or different clip designs can be used in different portions of the assembly.

The modular nature of the modular frames and their method of joining advantageously can provide means for securing modular frames of the inventive subject matter to other modular frames and objects other than other modular frames. For example, it is contemplated that a modular frame of the inventive subject matter could couple with a container (e.g., a box or a water bottle, etc.) that comprises a coupler configured to releasably couple with a coupler of the modular frame. In some embodiments, the container could comprise a bottom portion of a modular frame configured to releasably couple with a top portion of a modular frame. In some embodiments, the container could comprise a clip configured to releasably couple with a clip receiving portion of a modular frame.

Figure 13A:
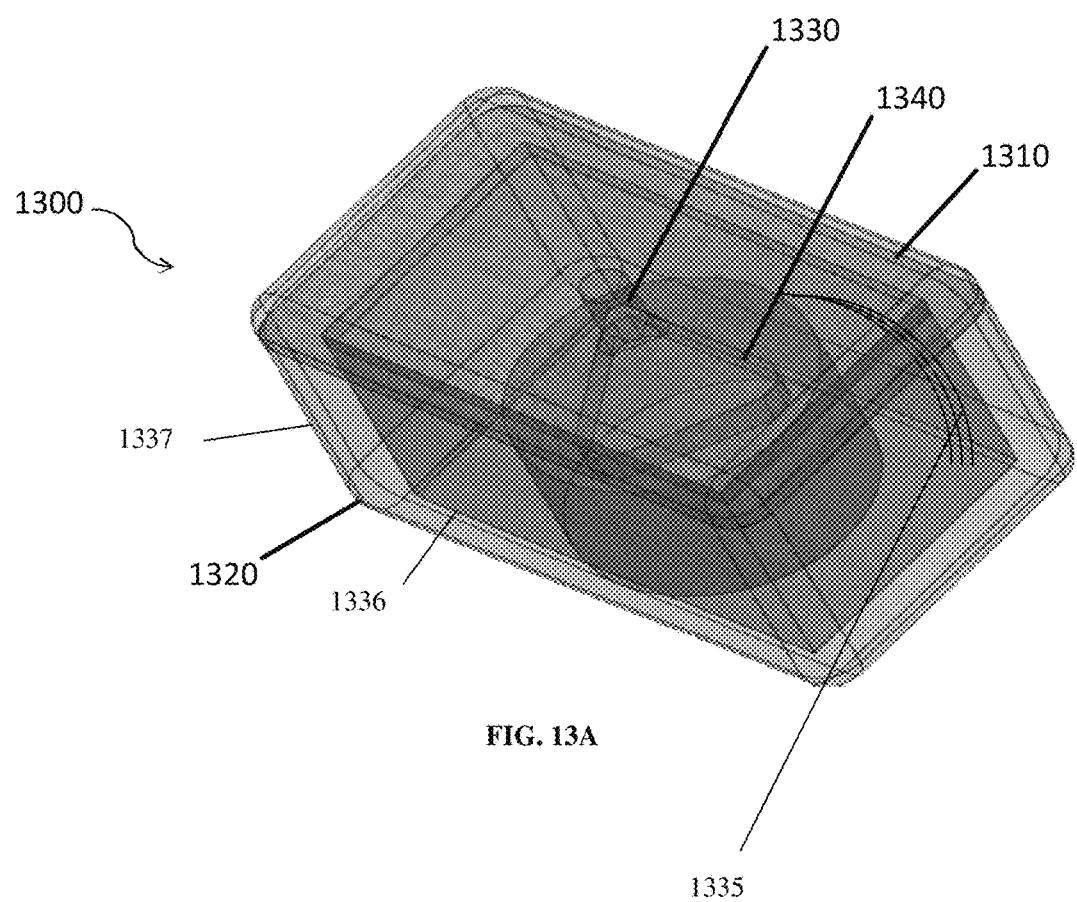
FIG. 13A shows a perspective view of a container of the inventive subject matter, showing interfaces for portions of a frame.
Figure 13B:
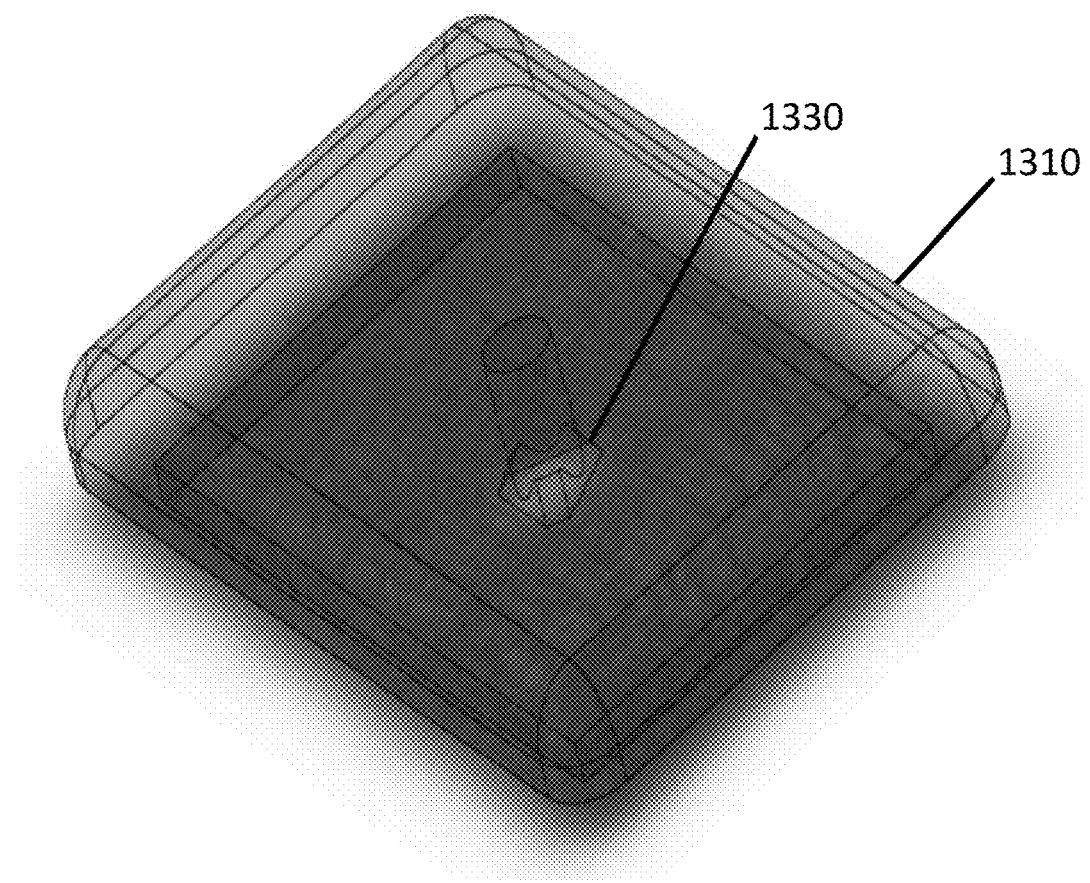
FIG. 13B shows a perspective view of a top of a container of the inventive subject matter.

FIG. 13A shows a container or box 1300 of the inventive subject matter that includes a base 1320 and a cover 1310 that are configured to secure a geometric solid therein, with or without being placed in a modular frame. In the example shown, the cover 1310 includes a crystal interface 1330 that is sized and dimensioned to mate with a truncated vertex of the crystal. Additionally or alternatively, interface 1330 could comprise a coupler or otherwise conform to all or part of a vertex saddle or frame arm of a modular frame. A more detailed view of an exemplary top can be seen in FIG. 13B. Similarly, the base 1320 can include a base interface or pedestal 1340 that interfaces a face of the crystal and holds the crystal in place. Alternatively or additionally the base interface 1340 can include modular frame components that are configured to removably couple with modular frame partially enclosing the crystal. For example, the base interface 1340 can include all or part of a bottom portion of a part modular frame as depicted in FIG. 12B, allowing it to be joined to a top portion of a two part modular frame as depicted in FIG. 12A. Similarly, in other embodiments a base interface 1340 can incorporate one or more clip interfaces.

One or both of the cover 1310 and base 1320 could include electrical connections 1335 to the geometric solid, preferably on the Z-axis of the geometric solid. In some embodiments, a container of the inventive subject matter could be made of ceramic and be metal plated (e.g., copper with gold flash, etc.). The inside 1336 of the container could be isolated electrically from the outside 1337 of the container. The outside surfaces of the cover 1310 and base 1320 could be connected electrically. Additionally or alternatively the inside surface of the cover 1310 and base 1320 could be connected electrically. A portion of the geometric solid in the container could be connected to an outer surface of the container, while a different portion of the geometric solid could be connected to an inside surface of the box. It should be appreciated that an inside or outside portion of the cover, an inside or outside portion of the base, or any portion of a crystal could be electrically connected in any suitable manner.

Figure 14A:
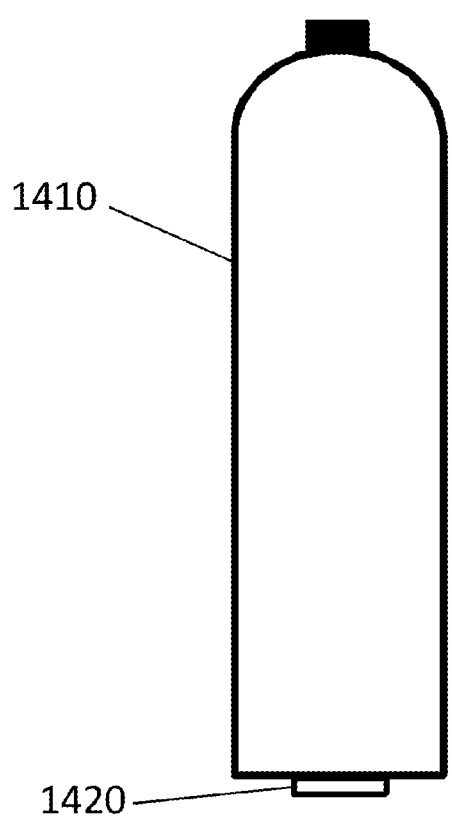
FIG. 14A and FIG. 14B show an alternative container of the inventive subject matter.
Figure 14B:
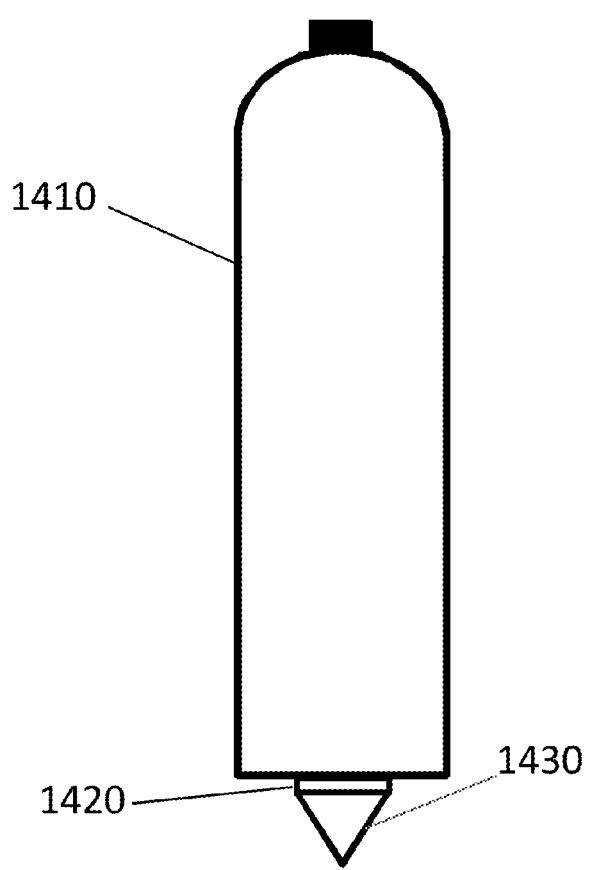

Similarly, the attachment sites utilized in the assembly of modular frames of the inventive subject matter can be used to affix such modular frames to the external surface of a suitable object, for example a container suitable for storing fluid (e.g., a water bottle, etc.). An example of this is shown in FIGS. 14A and 14B, which depicts a container 1410 that includes a modular frame interface 1420. Such a modular frame interface can, for example, provide attachment to a face of a modular frame of the inventive concept. Such an embodiment is shown in FIG. 14B, which depicts a modular frame 1430 secured to a container 1410 via a frame interface 1420. Such a frame interface 1420 can include components of a modular frame, for example a clip interface or a bottom portion of a two part modular frame, in order to simplify attachment of the modular frame. It should be appreciated that the container could be configured to affix a modular frame to an internal surface of the container.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A modular frame configured to hold a geometric solid including a vertex and an edge, comprising:
    four vertex saddles including a first vertex saddle sized and dimensioned to receive the vertex;
    six edge struts including a first edge strut and a second edge strut, wherein the first edge strut is sized and dimensioned to cover at least a portion of the edge;

first and second frame components removably coupled to one another via a coupler to form the first edge strut; and wherein the first edge strut and the second edge strut extend away from the first vertex saddle to thereby partially define a face.

2. The modular frame of claim 1, further comprising at least one padding configured to at least one of prevent a sliding of the geometric solid within the frame, and protect the geometric solid from damage.

3. The modular frame of claim 1, wherein the first edge strut comprises a magnetic fastener that is configured to removably couple with a second magnetic fastener of a second modular frame.

4. The modular frame of claim 1, wherein the coupler is a clip.

5. The modular frame of claim 1, wherein the first and second frame components are removably coupled to one another via the coupler to form the first vertex saddle.

6. The modular frame of claim 1, further comprising a base having a second coupler configured to mate with at least one of the first edge strut and the first vertex saddle.

7. The modular frame of claim 1, wherein the face is partially defined by the first and second edge struts that extend away from the first vertex saddle, and a third edge strut of the six edge struts.

8. The modular frame of claim 1, wherein the geometric solid is a truncated and chamfered tetrahedron crystal.

* * * * *